(12) United States Patent
Xiong

(10) Patent No.: US 9,883,434 B2
(45) Date of Patent: Jan. 30, 2018

(54) DATA TRANSMITTING METHOD, HANDOVER METHOD, APPARATUS, EQUIPMENT, ACCESS NODE, AND SYSTEM

(71) Applicant: Huawei Technologies Co., Ltd., Shenzhen (CN)

(72) Inventor: Chunshan Xiong, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 12 days.

(21) Appl. No.: 14/698,572

(22) Filed: Apr. 28, 2015

(65) Prior Publication Data
US 2015/0245264 A1 Aug. 27, 2015

Related U.S. Application Data

(63) Continuation of application No. PCT/CN2012/083764, filed on Oct. 30, 2012.

(51) Int. Cl.
*H04W 36/08* (2009.01)
*H04W 80/06* (2009.01)
*H04W 28/00* (2009.01)
*H04L 29/08* (2006.01)
(Continued)

(52) U.S. Cl.
CPC ......... *H04W 36/08* (2013.01); *H04L 67/1097* (2013.01); *H04L 67/2814* (2013.01); *H04L 67/2842* (2013.01); *H04W 28/00* (2013.01); *H04W 36/0011* (2013.01); *H04W 80/06* (2013.01); *H04W 88/182* (2013.01)

(58) Field of Classification Search
CPC . H04L 67/2847; H04L 65/4084; H04L 65/80; H04L 67/02; H04L 67/142; H04L 67/306; H04L 67/322; H04L 67/1097–67/2842

USPC .......................................................... 370/331
See application file for complete search history.

(56) References Cited

U.S. PATENT DOCUMENTS

| 5,600,652 A | * | 2/1997 | Kreamer ................. H04L 12/43 370/396 |
| 5,987,476 A | * | 11/1999 | Imai .................. G06F 17/30902 |
| 6,463,508 B1 | | 10/2002 | Wolf et al. |

(Continued)

FOREIGN PATENT DOCUMENTS

| CN | 1465166 A | 12/2003 |
| CN | 101088238 A | 12/2007 |

(Continued)

OTHER PUBLICATIONS

Sen, S., et al., "Proxy Prefix Caching for Multimedia Streams," Eighteenth Annual Joint Conference of the IEEE Computer and Communications Societies, INFOCOM '99, Mar. 21-25, 1999, pp. 1310-1319.

*Primary Examiner* — Edan Orgad
*Assistant Examiner* — Emmanuel Maglo
(74) *Attorney, Agent, or Firm* — Slater Matsil, LLP

(57) ABSTRACT

A data transmitting method includes receiving from a UE a request to apply for accessing a data file in an external server. If a first part of content of the data file is stored an RAN cache, the first part of the content is transmitted to the UE. When the first part of the content is transmitted to the UE, a second part of the content of the data file is obtained from the external server. After all the first part of the content is transmitted to the UE, the second part of the content is transmitted to the UE.

20 Claims, 7 Drawing Sheets

(51) Int. Cl.
*H04W 88/18* (2009.01)
*H04W 36/00* (2009.01)

(56) References Cited

U.S. PATENT DOCUMENTS

| | | | |
|---|---|---|---|
| 6,704,768 B1* | 3/2004 | Zombek | H04L 1/1635 370/254 |
| 8,090,371 B2* | 1/2012 | Gallagher | H04W 60/04 370/331 |
| 8,099,758 B2* | 1/2012 | Schaefer | G06F 17/30082 726/1 |
| 8,521,197 B2* | 8/2013 | Almodovar Herraiz | H04L 51/063 455/418 |
| 8,909,728 B2* | 12/2014 | Kotecha | H04W 4/18 709/212 |
| 8,943,218 B2* | 1/2015 | Malaby | H04L 67/1097 348/E5.008 |
| 9,191,151 B2* | 11/2015 | Luby | H04N 21/23106 |
| 9,380,096 B2* | 6/2016 | Luby | H04N 21/23106 |
| 9,386,064 B2* | 7/2016 | Luby | H04N 21/23106 |
| 9,432,433 B2* | 8/2016 | Luby | H04N 21/23106 |
| 2003/0218996 A1 | 11/2003 | Sumino et al. | |
| 2004/0010613 A1 | 1/2004 | Apostolopoulos et al. | |
| 2006/0146744 A1 | 7/2006 | Vasudevan et al. | |
| 2006/0153125 A1 | 7/2006 | Lee et al. | |
| 2006/0259949 A1* | 11/2006 | Schaefer | G06F 17/30082 726/1 |
| 2007/0061469 A1* | 3/2007 | Rhim | H04L 65/4069 709/227 |
| 2008/0310365 A1 | 12/2008 | Ergen et al. | |
| 2010/0034089 A1 | 2/2010 | Kovvali et al. | |
| 2010/0318632 A1 | 12/2010 | Yoo et al. | |
| 2011/0136488 A1* | 6/2011 | Kuvvali | H04W 36/08 455/436 |
| 2011/0164589 A1* | 7/2011 | Lee | H04W 36/02 370/331 |
| 2011/0202634 A1* | 8/2011 | Kovvali | H04L 12/14 709/219 |
| 2012/0102140 A1* | 4/2012 | Nadas | H04L 43/0888 709/213 |
| 2012/0297009 A1* | 11/2012 | Amir | H04L 12/66 709/213 |
| 2012/0327901 A1 | 12/2012 | Ahluwalia | |
| 2013/0003708 A1* | 1/2013 | Ko | H04W 4/18 370/338 |
| 2013/0144906 A1* | 6/2013 | Bhupalam | H04L 65/4084 707/771 |
| 2014/0051445 A1* | 2/2014 | Vikberg | H04W 36/02 455/436 |

FOREIGN PATENT DOCUMENTS

| | | |
|---|---|---|
| CN | 101375613 A | 2/2009 |
| CN | 101621524 A | 1/2010 |
| CN | 101675684 A | 3/2010 |
| CN | 101917742 A | 12/2010 |
| CN | 102025593 A | 4/2011 |
| CN | 102780712 A | 11/2012 |

* cited by examiner

DATA TRANSMITTING METHOD, HANDOVER METHOD, APPARATUS, EQUIPMENT, ACCESS NODE, AND SYSTEM

This application is a continuation of International Application No. PCT/CN2012/083764, filed on Oct. 30, 2012, which is hereby incorporated by reference in its entirety.

TECHNICAL FIELD

The present embodiment of the invention relates to the field of communications technologies, and in particular, to a data transmitting method, a handover method, an apparatus, a user equipment, a radio access node, and a system.

BACKGROUND

As smart phones and tablet computers are widely used, videos and other content services have developed rapidly. Downloading of large quantities of videos by using radio access technologies, especially repetitive downloading of hotspot content, consumes many network transmission resources. When a large quantity of users apply for downloading simultaneously with a service source of one hotspot content, congestion occurs on the service source, and as a result, many users cannot download the content or the downloading time is longer, especially for online videos, this may cause that a frozen picture occurs for many times during watching.

At present, in view of this, operators apply cache technologies to wireless communication systems. For example, a cache function device is placed on an RAN node to speed up UE access to web content and reduce a delay of web content access. Using a cache on an RAN node, however, requires that a storage device that stores content, for example, a hard disk, is added to the RAN node. But, there are a large number of RAN nodes, and the RAN nodes often provide limited device spaces. Therefore, it is impossible to install multiple hard disks on one RAN node to increase storage capacity. As a result, one RAN node can store only a small quantity of videos. When a UE accesses a video, and if the video is not stored in the cache of the RAN node, video access acceleration still cannot be implemented. This means that an initial play delay of video access of the UE cannot be reduced. Obviously, when more videos are stored in the cache on the RAN node, the transmission of more videos can be accelerated and user experience in using the videos will be better.

However, due to the cost for adding storage devices that store content on RAN nodes and the limited device space, the quantity of videos that can be stored in a cache on an RAN node is still limited, and therefore the effect of acceleration of video transmission that is achieved is not notable. In addition, when a UE moves to another RAN node, because a TCP connection with a source RAN node cannot be ensured, a technical problem that a video cannot be played normally results.

SUMMARY

Embodiments of the present invention provide a data transmitting method, a handover method, an apparatus, a user equipment, an access node, and a system, so as to solve the technical problem in the prior art that data transmission cannot be effectively accelerated due to the cost for adding storage devices that store videos on RAN nodes and the limited device space, thereby reducing user experience.

The embodiments of the present invention provide a data transmitting method, a handover method, an apparatus, a user equipment, a radio access node, a data transmitting system, and a handover system, so as to solve the technical problem in the prior art that a video cannot be played normally when a UE moves to another RAN node.

To solve the above technical problems, the embodiments of the present invention disclose the following technical solutions.

According to a first aspect, a data transmitting method is provided. A request to apply for accessing a data file in an external server is received from a user equipment (UE). If a first part of content of the data file is stored in a memory RAN cache of a radio access node, the first part of the content is transmitted to the UE. When the first part of the content is transmitted to the UE, a rest second part of the content of the data file is obtained from the external server. After all the first part of the content is transmitted to the UE, the second part of the content is continued to transmit to the UE.

With reference to the first aspect, in a first possible implementation manner, before the receiving from a user equipment UE a request to apply for accessing a data file in an external server, the method further comprises: replicating a first part of content of at least one data file stored in the external server; and storing the first part of the content and a uniform resource locator URL corresponding to the data file in the RAN cache.

With reference to the first aspect or the first possible implementation manner, in a second possible implementation manner, before all the first part of the content is transmitted to the UE, the rest second part of the content of the data file has been obtained from the external server, so that the second part of the content continues to be transmitted to UE after all the first part of the content is transmitted.

With reference to the first aspect or the first or second possible implementation manner, in a third possible implementation manner, wherein, a smallest space occupied by the first part of the content stored in the RAN cache is 2.5×RTT×video bit rate, wherein the RTT is a round trip time for data transmission between the UE and the external server, and the video bit rate is a bit rate of video data under a normal play rate of the video.

With reference to the first aspect or the first or second or third possible implementation manner, in a fourth possible implementation manner, the determining whether the first part of the content of the data file requested and corresponding to the URL is stored in the RAN cache comprises: determining whether the request comprises Range header information; if the request does not comprise the Range header information, determining that the first part of the content of the requested data file is stored in the RAN cache; if the request comprises the Range header information, continuing to determine whether a start download position indicated by information following the Range is less than a size of a stored start part of the data file; if the start download position is less than the size of the stored start part of the data file, determining that the first part of the content of the requested data file is within content stored in the RAN cache; the sending the first part of the content of the data file to the UE comprises: sending the first part of the content beginning from the start indicated by the Range to the UE; and if the start download position is greater than the size of the stored start part of the data file, determining that the first part of the content of the requested data file is not within the content stored in the RAN cache.

With reference to the first aspect or the first or second or third or fourth possible implementation manner, in a fifth possible implementation manner, the method further comprises: storing the first part of the content of the data file obtained from the external server and a uniform resource locator URL corresponding to the data file obtained from the external server, wherein the first part of the content is a start part or an entirety of the data file obtained from the external server.

With reference to the first aspect or the first or second or third or fourth or fifth possible implementation manner, in a sixth possible implementation manner, the method further comprises: when the request to access the data file in the external server is received from the UE, obtaining metadata of the data file; and storing the metadata of the data file in the RAN cache.

According to a second aspect, a data transmitting method is provided, including: in a process of handing over a user equipment UE from a memory-equipped source radio access RAN cache node to a target RAN cache node, if the UE detects that a Transmission Control Protocol TCP connection for downloading a data file or a part of content of a data file from an external server is in a released state, reestablishing, by the UE, a TCP connection with the external server; and downloading, by the UE, the data file or rest content of the part of the content of the data file from the external server by using the TCP connection.

According to a third aspect, a handover method is provided, including: selecting, by a memory-equipped source radio access RAN cache node for a user equipment UE that requires handover, a memory-equipped target radio access RAN cache node; if a Transmission Control Protocol TCP connection exists between the source RAN cache node and an external server, sending, by the source RAN cache node, a TCP connection release command to the external server; receiving, by the source RAN cache node, a TCP reply packet for releasing the TCP connection sent by the external server; sending, by the source RAN cache node, a TCP connection release command to the UE; receiving, by the source RAN cache node, a TCP reply packet for releasing the TCP connection sent by the UE; and sending, by the source RAN cache node, a handover command to the UE, so that the UE is handed over to the target RAN cache.

According to a fourth aspect, a data transmitting apparatus is provided. A first receiving unit is configured to receive from a UE a request to apply for accessing a data file in an external server. A determining unit is configured to, when the first receiving unit receives the request, determine whether a first part of content of the data file is stored in a memory RAN cache of a radio access node. A first sending unit is configured to, when the determining unit determines that the first part of the content of the data file is stored in the RAN cache, send the first part of the content to the UE. A first obtaining unit is configured to, when the first sending unit sends the first part of the content to the UE, obtain a rest second part of the content of the data file from the external server. The first sending unit is further configured to, after the first part of the content is sent to the UE, continue to send the second part of the content obtained by the first obtaining unit to the UE.

With reference to the third aspect, in a first possible implementation manner, a replicating unit is configured to before the first receiving unit receives from the UE the request to apply for accessing the data file in the external server, replicate a first part of content of at least one data file stored in the external server. A storing unit is configured to store the first part of the content replicated by the replicating unit and a uniform resource locator URL corresponding to the data file in the RAN cache.

With reference to the second aspect or the first possible implementation manner, in a second possible implementation manner, further comprising a second receiving unit, configured to: before the first receiving unit receives from the UE the request to apply for accessing the data file in the external server, receive a first Transmission Control Protocol TCP connection request sent by the UE to the external server; and a first activating unit, configured to activate a Transmission Control Protocol TCP proxy and act as a proxy of the external server to send a first TCP connection response to the UE.

With reference to the third aspect or the first or second possible implementation manner, in a third possible implementation manner, further comprising a second obtaining unit, configured to: after the first receiving unit receives from the user equipment UE the request to access the data file in the external server, or after the second receiving unit receives the first TCP connection request sent by the UE to the external server, obtain a URL corresponding to the data file according to the request to access the data file in the external server; a matching unit, configured to respectively match the URL of the data file that is obtained by the second obtaining unit with stored URLs of multiple data files, and send a matching result to a judging unit, or send unmatching determining to the first obtaining unit; and the judging unit, configured to: when receiving the result indicating that the matching is successful and sent by the matching unit, determine whether content of the data file requested and corresponding to the URL are stored in the RAN cache, and send a determining result that the content is stored to the first sending unit, or send a determining result that the content is not stored to the first obtaining unit. The first sending unit is further configured to: when receiving the determining result of the judging unit, send the content of the data file stored in the RAN cache and corresponding to the URL to the UE. The first obtaining unit is further configured to: when receiving the unmatching result sent by the matching unit, or when receiving the determining result that the content is not stored which is sent by the judging unit, download the data file corresponding to the URL from the external server. The second sending unit is further configured to transmit the data file downloaded by the first obtaining unit and corresponding to the URL to the UE.

With reference to the third possible implementation manner, in a fourth possible implementation manner, wherein the judging unit specifically comprises: a header information judging unit, configured to determine whether the request comprises Range header information; a determining unit, configured to: when the header information judging unit determines that the request does not comprise the Range header information, determine that the content of the requested data file is in the RAN cache; and a position judging unit, configured to: when the header information judging unit determines that the request comprises the Range header information, continue to determine whether a start download position indicated by information following the Range is less than a size of a stored start part of the data file; and if the start download position is less than the size of the stored start part of the data file, determine that the content of the requested data file is within content stored in the RAN cache; and if the start download position is greater than the size of the stored start part of the data file, determine that the content of the requested data file is not within content stored in the RAN cache.

With reference to the fourth possible implementation manner, in a fifth possible implementation manner, further comprising: a second activating unit, configured to: before the first obtaining unit downloads the data file corresponding to the URL from the external server, activate an HTTP transparent proxy and send a second TCP connection request to the external server; and a third receiving unit, configured to receive a second TCP connection response sent by the external server to the second TCP connection request.

With reference to the second aspect or one of the first to fifth possible implementation manner, in a sixth possible implementation manner, further comprising: a third obtaining unit, configured to: when the judging unit determines that the first part of the content of the data file is not stored in the RAN cache, obtain all content of the data file from the external server; and a third sending unit, configured to transmit all the content of the data file that are obtained by the third obtaining unit to the UE.

With reference to the second aspect or one of the first to sixth possible implementation manner, in a seventh possible implementation manner, further comprising: a first storing unit, configured to store the first part of the content of the data file obtained from the external server and a uniform resource locator URL corresponding to the data file obtained from the external server, wherein the first part of the content is a start part or an entirety of the data file obtained from the external server.

With reference to the second aspect or one of the first to seventh possible implementation manner, in a eighth possible implementation manner, further comprising: a fourth obtaining unit, configured to: when the request to access the data file in the external server is received from the UE, obtain metadata of the data file; and a second storing unit, configured to store the metadata of the data file that is obtained by the fourth obtaining unit in the RAN cache.

According to a fifth aspect, a data transmitting apparatus is provided, including: a detecting unit, configured to: in a process of handing over a user equipment UE from a memory-equipped source radio access RAN cache node to a target RAN cache node, detect whether a Transmission Control Protocol TCP connection for downloading a data file or a part of content of a data file from an external server is in a released state; a reestablishing unit, configured to: when the detecting unit detects that the TCP connection for downloading a data file is in a released state, reestablish a TCP connection with the external server; and a transmitting unit, configured to download the data file or rest content of the part of the content of the data file from the external server by using the TCP connection established by the reestablishing unit.

With reference to the fifth aspect, in a first possible implementation manner, further comprising: a judging unit, configured to: when the detecting unit detects that the TCP connection for downloading a data file or a part of content of a data file from the external server is in a released state, determine whether the data file or the part of the content of the data file is completely downloaded and send a determining result that downloading is incomplete to the reestablishing unit. The reestablishing unit is further configured to: when receiving the determining result that downloading is incomplete which is sent by the judging unit, reestablish the TCP connection with the external server.

With reference to the first possible implementation manner, in a second possible implementation manner, where the judging unit is specifically configured to: when the detecting unit detects that the TCP connection for downloading a data file or a part of content of a data file is in a released state, compare to determine whether a size of downloaded content of the data file is greater than a size of the data file, and if the size of the downloaded content of the data file is greater than or equal to the size of the data file, determine that the content of the data file is completely downloaded; and if the size of downloaded content of the data file is less than the size of the data file, determine that the content of the data file is not completely downloaded and send a determining result that downloading is incomplete to the reestablishing unit; or compare to determine whether a size of the downloaded part of the content of the data file is greater than a size of the data file, if the size of the downloaded content of the data file is greater than or equal to the size of the data file, determine that the part of the content of the data file is completely downloaded, and if the size of the downloaded part of the content of the data file is less than the size of the data file, determine that the part of the content of the data file is not completely downloaded and send a determining result that downloading is incomplete to the reestablishing unit.

According to a sixth aspect, a handover apparatus is provided, including: a selecting unit, configured to select a memory-equipped target radio access RAN cache node for a user equipment UE that requires handover and request the target RAN cache node to reserve a radio resource for the UE; a first sending unit, configured to: when a Transmission Control Protocol TCP connection exits between the handover apparatus and an external server, send a TCP connection release command to the external server; a first receiving unit, configured to receive a TCP reply packet for releasing the TCP connection sent by the external server; a second sending unit, configured to: when the first receiving unit receives the TCP reply packet for releasing the TCP connection, send a TCP connection release command to the UE; a second receiving unit, configured to receive a TCP reply packet for releasing the TCP connection sent by the UE; and a handover unit, configured to send a handover command to the UE, instructing the UE to hand over to the target RAN cache node.

According to a seventh aspect, a radio access node is provided, including: a radio transceiver, configured to receive from a user equipment UE a request to access a data file in an external server; and a processor, configured to: when the radio transceiver receives the request, determine whether a first part of content of the data file is stored in a memory of the radio access node, an RAN cache; when the first part of the content is stored, transmit the first part of the content to the radio transceiver; when the first part of the content is transmitted to the radio transceiver, obtain a rest second part of the content of the data file from the external server; and transmit the second part of the content to the radio transceiver. The radio transceiver is further configured to: after the first part of the content sent by the processor is received, transmit the first part of the content to the UE; and after all the first part of the content is transmitted, continue to transmit the second part of the content to the UE.

According to an eighth aspect, a user equipment is provided, including: a detector, configured to: when the user equipment UE is handed over from a memory-equipped source radio access RAN cache node to a target RAN cache node, detect whether a TCP connection for downloading a data file from an external server is in a released state; and a processor, configured to: when the detector detects that the TCP connection is in a released state, reestablish a TCP connection with the external server, and continue to download the data file from the external server by using the TCP connection.

According to a ninth aspect, a data transmitting system is provided, including a user equipment UE, a memory-equipped radio access RAN cache node, and an external server. The UE is configured to request to apply for accessing a data file in the external server, and receive the data file sent by the RAN cache node. The RAN cache node is configured to: after receiving from the UE the request to apply for accessing the data file in the external server, if it is determined that a first part of content of the data file is stored in a memory of the radio access node, an RAN cache, transmit the first part of the content to the UE; when transmitting the first part of the content to the UE, request with the external server to obtain a rest second part of the content of the data file; receive the rest second part of the content of the data file that is sent by the external server; and after all the first part of the content is transmitted to the UE, continue to transmit the second part of the content to the UE. The external server is configured to: when receiving from the RAN cache node the request to obtain the rest second part of the content of the data file, send the rest second part of the content of the data file to the RAN cache node.

According to a tenth aspect, a data transmitting system is provided, including a user equipment UE and an external server. The user equipment is configured to: in a process of handover from a memory-equipped source radio access RAN cache node to a target RAN cache node, if it is detected that a Transmission Control Protocol TCP connection for downloading a data file or a part of content of a data file from the external server is in a released state, send a TCP connection reestablishment request to the external server and receive a TCP connection response sent by the external server; request with the external server to download the data file or download rest content of the part of the content of the data file by using the established TCP connection; and receive the data file sent by the external server or download the rest content of the part of the content of the data file. The external server is configured to receive the TCP connection reestablishment request sent by the user equipment and send the TCP connection response to the UE; and when receiving from the UE the request to download the data file or download the rest content of the part of the content of the data file, send the data file or the rest content of the part of the content of the data file to the UE.

According to an eleventh aspect, a handover system is provided, including a user equipment UE, a memory-equipped source radio access RAN cache node, and an external server. The source RAN cache node is configured to select a memory-equipped target radio access RAN cache node for the user equipment UE that requires handover; when it is determined that a Transmission Control Protocol TCP connection exists between the source RAN cache node and the external server, send a TCP connection release command to the external server by using the TCP connection; when receiving a TCP reply packet for releasing the TCP connection sent by the external server, send a TCP connection release command to the UE; and when receiving a TCP reply packet for releasing the TCP connection sent by the UE, send a handover command to the UE. The external server is configured to receive the TCP connection release command sent by the source RAN cache node, and send the TCP reply packet for releasing the TCP connection to the source RAN cache node. The UE is configured to receive the TCP connection release command sent by the source RAN cache node, send the TCP reply packet for releasing the TCP connection to the source RAN cache node, and when receiving the handover command sent by the source RAN cache node, hand over to the target RAN cache according to the handover command.

As can be known from the above technical solutions, in the embodiments of the present invention, a first part of content of at least one data file stored in the external server is replicated to the RAN cache, and because all the content of the data file is still stored in the external server, the second part of the content of the data file is definitely also stored in the external server. This means that the RAN cache only stores a part of the content of the data file, which saves a storage space on the RAN cache node. Moreover, when the first part of the content (for example, a first part of a video of a video file) is transmitted to the user equipment, the second part of the content of the data file is obtained from the external server. Therefore, so long as the data of the external Server has reached the RAN cache before the UE completes downloading the first part of the video stored in the RAN cache and after the first part of the video is transmitted to the UE, the second part of the video continues to be transmitted to the UE, temporary stop or discontinuity (that is, commonly known as freeze) will not occur on playing of the video on the UE. In addition, because a distance between the RAN cache and the UE is less than a distance between the external server and the UE, that is, because the RAN cache is nearer to the UE, a delay of communication between them is shorter. This avoids the problem of a long initial play delay in playing data (for example, a video), greatly reduces an initial delay of data downloading, improves user satisfaction, and enhances user experience. In addition, in the embodiments of the present invention, when the UE detects that the TCP connection for downloading a data file or a part of content of a data file from the external server is released, the UE reestablishes, through the target RAN cache node, a TCP connection with the external server connected to the target RAN cache node and continues to download the data file or download rest content of the part of the content of the data file by using the reestablished TCP connection. This solves the technical problem that data cannot be normally played (that is, frozen) when the UE moves to another RAN node and therefore improves user experience.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

For ease of description, in the embodiments of the present invention, an RAN cache is used to represent a memory on an RAN node and an RAN cache node is used to represent a memory-equipped RAN node.

Figure 1:
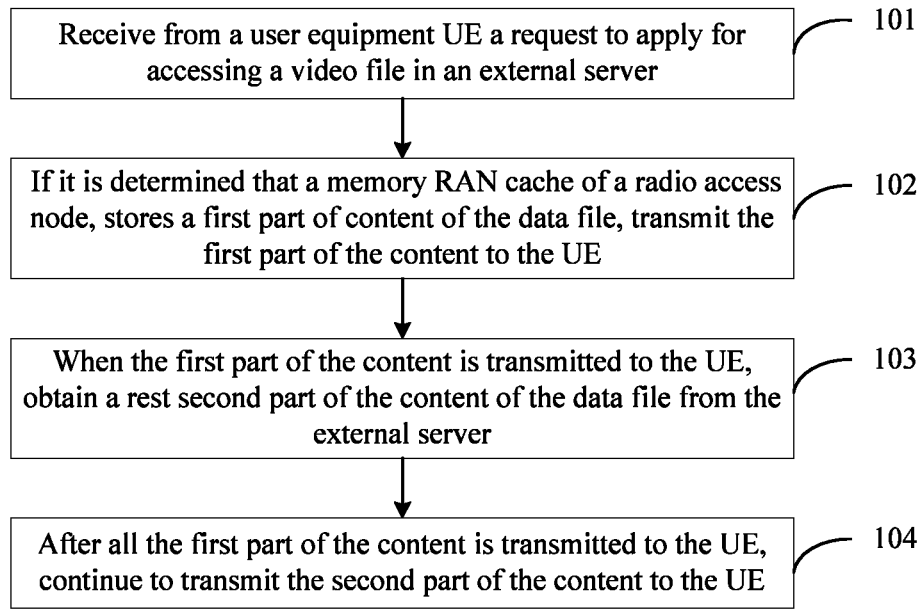
FIG. 1 is a flowchart of a method for accelerating data transmission according to an embodiment of the present invention.

FIG. 1 is a flowchart of a data transmitting method according to an embodiment of the present invention. In this embodiment, a data file in this embodiment is exemplarily a video file but is not limited thereto. The data file may also be MP3 data or installation package data of the Linux operating system. The method includes the following steps.

Step 101: Receive from a user equipment UE a request to apply for accessing a data file in an external server.

In this step, if a user wants to download video data to view or MP3 data to listen to, the user may click a data connection request on an external server, on the UE and an RAN cache node will receive the connection request sent by the UE for downloading data.

In this embodiment, the RAN cache can establish a TCP connection with the external server and data can be transmitted between the RAN cache and the external server.

Step 102: If it is determined that a memory RAN cache of a radio access node, stores a first part of content of the data file, transmit the first part of the content to the UE.

In this embodiment, after receiving the connection request for downloading the data file, the RAN cache node first determines whether the data file is stored in the RAN cache. Generally, the RAN cache stores a large quantity of data files (such as video files and Linux installation files). If the RAN cache stores a part of the content of the data file, the RAN cache node transmits the part of the content of the data file to the UE. However, if the complete data file is stored, the RAN cache node sends the complete data content to the UE.

In this embodiment, the RAN cache stores the data file in multiple manners, and this embodiment uses the following two manners as examples, but are not limited to the following two manners:

In one manner, the RAN cache only stores a first part of content of at least one data file stored in the external server, where the first part of the content is a start part of the data file and other content in the data file than the beginning content is defined as a second part of the content. Because the external server stores the entire data file, the external server definitely stores the second part of the content of the data file.

In another manner, in addition to first parts of content of some data files (that is, data files stored in the external server), the RAN cache also stores entire data content of some other data files, where the entire data content of the data files or the other data files is still stored in the external server.

Optionally, in the first manner or the second manner, a size of the first part of the content is generally less than a size of the second part of the content, and definitely, the size of the first part of the content may also be equal to the size of the second part of the content, which is not limited in this embodiment.

Optionally, for a video file, before all the first part of the content is transmitted to the UE, the rest second part of the content of the data file has been obtained from the external server, so that the second part of the content is transmitted to UE in a nonstop manner after all the first part of the content is transmitted. From the perspective of the user, this means that, after the user completes downloading the stored first part of the content, the user can continue to download the second part of the content in a nonstop manner.

Optionally, a smallest space occupied by the first part of the content stored in the RAN cache is 2.5×RTT×video bit rate, where the RTT is a round trip time for data transmission between the UE and the external server, and the video bit rate is a bit rate (bit rate) of video data under a designated normal play rate (for example, 25 frames per second) of the video. Optionally, if MP3 data is downloaded, the video bit rate in the formula is replaced by an MP3 bit rate. However, the present invention is limited thereto and there may be other calculations, provided that, after the user completes downloading the stored first part of data, the user can continue to download the second part of the data in a nonstop manner. No limitation is set in this embodiment.

Step 103: When the first part of the content is transmitted to the UE, obtain a rest second part of the content of the data file from the external server.

In this embodiment, if, in step 102, the RAN cache stores the first part of the content of the data file, the RAN cache node sends, to the external server, a connection request to obtain the rest content (that is, the second part of the content) of the data file, and receive the second part of the content of the data file that is sent by the external server.

This means that, in step 102, when the first part of the content is transmitted to the UE, the second part of the content of the data file needs to be obtained from the external server simultaneously, so that the second part of the content continues to be transmitted to UE after all the first part of the content is transmitted to the UE, thereby ensuring continuity of data file transmission.

It should be noted that, if, in step 102, the RAN cache stores content of the entire data file, step 103 and step 104 will not be executed.

Step 104: After all the first part of the content is transmitted to the UE, continue to transmit the second part of the content to the UE.

In this step, to ensure continuity of data file transmission, after the RAN cache node sends the first part of the content of the data file stored in the RAN cache to the UE, the RAN cache node will continue to send the obtained second part of the content to the UE.

In the embodiment of the present invention, a first part of content of at least one data file stored in the external server is replicated to the RAN cache, and because all the content of the data file is still stored in the external server (Server), the second part of the content of the data file is definitely also stored in the external server. This means that the RAN cache only stores a part of the content of the data file, which saves a storage space on the RAN cache node. Moreover, when the first part of the content (for example, a first part of a video of a video file) is transmitted to the user equipment, the second part of the content of the data file (for example, a second part of the video of the video file) is obtained from the external server. Using a video as an example, because a communication bandwidth between the RAN cache and the external Server is usually far greater than an air interface transmission rate of the radio system, so long as the data of the external Server has reached the RAN cache before the UE completes downloading the first part of the video stored in the RAN cache and after the first part of the video is transmitted to the UE, the second part of the video continues to be transmitted to the UE; therefore, temporary stop or discontinuity (that is, commonly known as freeze) will not occur on playing of the video on the UE. In addition, because a distance between the RAN cache and the UE is less than a distance between the external server and the UE, that is, because the RAN cache is nearer to the UE, a delay of communication between them is shorter. This avoids the problem of a long initial play delay in playing data (for example, a video), greatly reduces an initial delay of data downloading, improves user satisfaction, and enhances user experience.

Optionally, in an embodiment of the present invention, before the receiving from a user equipment UE a request to access a data file in an external server, the method may further include: replicating a first part of content of at least one data file stored in the external server; and storing the first part of the content and a uniform resource locator URL corresponding to the data file in the RAN cache. A size of the first part of the content is generally or mostly less than a size of the second part of the content (that is, the rest part of the content of the data file) and definitely, the size of the first part of the content may also be equal to the size of the second part of the content, which is not limited in this embodiment.

In other words, in this embodiment, only one part of the content of the data file stored in the external server is replicated to the RAN cache and the RAN cache also needs to store the uniform resource locator URL corresponding to the data file, while, in fact, the entire data file is still stored in the external server and accordingly, the second part of the content of the data file is also stored in the external server.

Optionally, in another embodiment of the present invention, before the receiving from a user equipment UE a request to access a data file in an external server, the method may further include: receiving, by the RAN cache node, a first Transmission Control Protocol (TCP) connection request sent by the UE to the external server; and activating a TCP proxy and acting as a proxy of the external server to send a first TCP connection response to the UE.

Optionally, in still another embodiment of the present invention, after the receiving from a user equipment UE a request to access a data file in an external server, or after the receiving a first TCP connection request sent by the UE to the external server, the method may further include: obtaining, by the RAN cache node, a URL corresponding to the data file according to the request to access the data file in the external server; respectively matching the obtained URL of the data file with stored URLs corresponding to multiple data files; if the matching is successful, determining whether content of the data file requested and corresponding to the data URL are stored in the RAN cache; if the content is stored in the RAN cache, sending the content of the data file stored in the RAN cache and corresponding to the URL to the UE; and if the matching is unsuccessful or if the content is not stored in the RAN cache, downloading the data file corresponding to the URL from the external server and transmitting the data file downloaded and corresponding to the URL to the UE.

If the matching is successful, the determining whether content of the data file requested and corresponding to the data URL is stored in the RAN cache specifically includes: determining whether the request includes Range header information, and if the request does not include the Range header information, determining that the content of the requested data file is within content stored in the RAN cache; if the request includes the Range header information, continuing to determine whether a start download position indicated by information following the Range is less than a size of a stored start part of the data file; if the start download position is less than the size of the stored start part of the data file, determining that the content of the requested data file is within content stored in the RAN cache, where the sending the first part of the content of the data file to the UE specifically is: sending the first part of the content starting from the beginning indicated by the Range to the UE, for example, sending all 500 bytes to the UE, where, if a Range exists and the Range=300, only data after 300 is sent to the UE, which means that only 200 bytes of data can be sent to the UE, where it should be noted that data is numbered starting with 0; and if the start download position is greater than the size of the stored start part of the data file, determining that the content of the requested data file is not within content stored in the RAN cache.

Optionally, in still another embodiment of the present invention, before the downloading the data file corresponding to the URL from the external server, the method may further include: activating, by the RAN cache node, a Hypertext Transfer Protocol (HTTP, Hypertext Transfer Protocol) transparent proxy to send a second TCP connection request to the external server; and receiving a second TCP connection response sent by the external server. Afterwards, the data file corresponding to the URL can be downloaded from the external server and the downloaded data file can be transmitted to the UE.

Optionally, the method may further include: if the first part of the content of the data file is not stored in the RAN cache, obtaining all content of the data file from the external server; and transmitting all the obtained content of the data file to the UE.

Optionally, the method may further include: storing the first part of the content of the data file obtained from the external server and the uniform resource locator URL corresponding to the data file obtained from the external server, where the first part of the content is a start part of the data file obtained from the external server.

Optionally, the method may further include: when the request to access a data file in the external server is received from the UE, obtaining metadata of the data file; and stores the metadata of the data file in the RAN cache.

Figure 2:
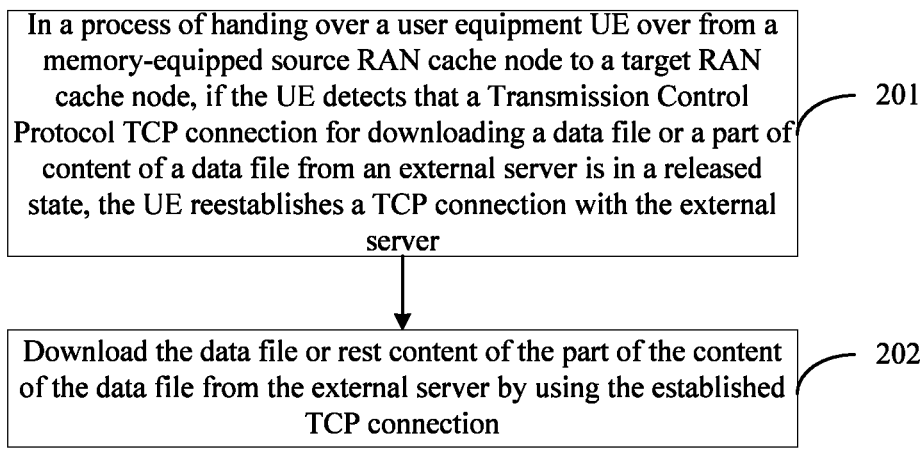
FIG. 2 is a flowchart of a data transmitting method according to an embodiment of the present invention.

FIG. 2 is a flowchart of a data transmitting method according to an embodiment of the present invention. In this embodiment, a data file is exemplarily a data file but is not limited thereto. The data file may also be MP3 data or an installation package of the Linux operating system. The method includes the following steps.

Step 201: In a process of handing over a user equipment UE over from a memory-equipped source RAN cache node to a target RAN cache node, if the UE detects that a Transmission Control Protocol TCP connection for downloading a data file or a part of content of a data file from an external server is in a released state, the UE reestablishes a TCP connection with the external server.

In this step, in a process of downloading data, the UE is definitely in an RRC connected state, and when the UE moves to another RAN cache node, a Handover handover process is required.

Optionally, after the UE detects that the TCP connection for downloading a data file or a part of content of a data file is released from the external server, preferably, the UE initiates establishment of another TCP connection with the external server after the UE is handed over to the target RAN cache node; or the UE initiates establishment of another TCP connection with the external server after waiting a short time (for example 50 ms) is delayed. The purpose of such processing is to prevent the UE from initiating establishment of another TCP connection with the external server through the source RAN cache node, which causes that the TCP connection cannot be established or will be disconnected soon after establishment.

Step 202: Download the data file or rest content of the part of the content of the data file from the external server by using the established TCP connection.

Optionally, when the UE detects that the TCP connection for downloading a data file or a part of content of a data file from the external server is in a released state, the method may further include: determining whether the data file or the part of the content of the data file that is downloaded from the external server is completely downloaded; if not, executing the step of the reestablishing, by the UE, a TCP connection with the external server; and otherwise, determining that the TCP connection is in a normal released state.

Optionally, the determining whether the data file or the part of the content of the data file is completely downloaded specifically includes: comparing to determine whether a size of downloaded content of the data file is greater than a size of the data file, if the size of the downloaded content is greater than or equal to the size of the data file, determining that the content of the data file is completely downloaded, and if the size of the downloaded content is less than the size of the data file, determining that the content of the data file is not completely downloaded.

In the embodiment of the present invention, when the UE detects that the TCP connection for downloading a data file or a part of content of a data file from the external server is disconnected, the UE reestablishes, through the target RAN cache node, a TCP connection with the external server connected to the target RAN cache node and continue to download the data file or download rest content of the part of the content of the data file by using the reestablished TCP connection. This solves the technical problem that data cannot be normally played (that is, frozen) when the UE moves to another RAN node and therefore improves user experience.

Figure 3:
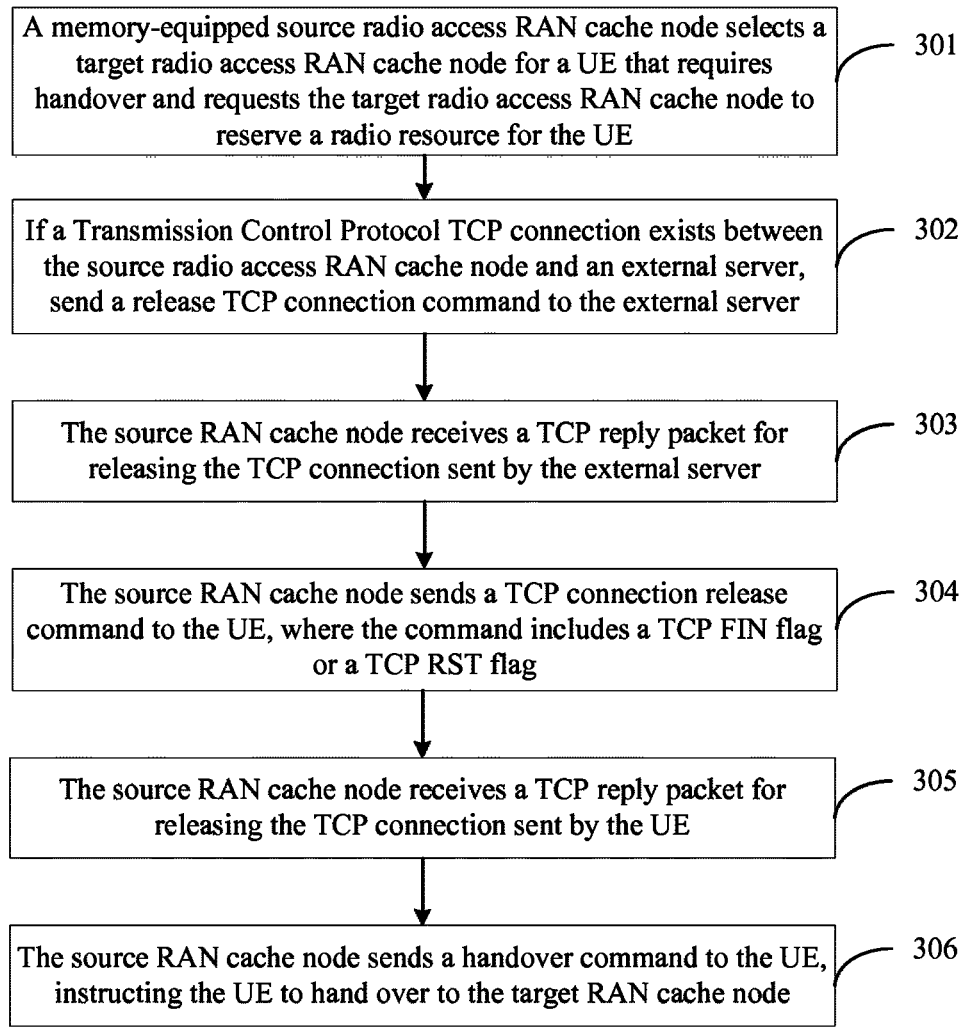
FIG. 3 is a flowchart of a handover method according to an embodiment of the present invention.

Referring to FIG. 3, FIG. 3 is a flowchart of a handover method according to an embodiment of the present invention. The method includes the following steps.

Step 301: A memory-equipped source radio access RAN cache node selects a target radio access node RAN cache node for a UE that requires handover and requests the target RAN cache node to reserve a radio resource for the UE.

Step 302: If a Transmission Control Protocol TCP connection exists between the source radio access RAN cache node and an external server, the source radio access RAN cache node sends a TCP connection release command to the external server, where the command includes a TCP FIN flag or a TCP RST flag.

It is determined whether a TCP connection exists between the external server and the UE by detecting whether a TCP proxy is activated. If no TCP proxy is activated, steps 302 to 306 does not need to be executed.

Step 303: The source RAN cache node receives a TCP reply packet for releasing the TCP connection sent by the external server.

Step 304: The source RAN cache node sends a TCP connection release command to the UE, where the command includes a TCP FIN flag or a TCP RST flag.

Step 305: The source RAN cache node receives a TCP reply packet for releasing the TCP connection sent by the UE.

Step 306: The source RAN cache node sends a handover command to the UE, instructing the UE to hand over to the target RAN cache node.

When in an RRC connected state, when the UE moves to another RAN cache node, Handover handover is required. Therefore, in the embodiment of the present invention, when data is being downloaded, if the UE moves to another RAN node, a TCP connection between the UE and an original RAN node will be disconnected and downloading is discontinued. If a video file is being downloaded and played, the video will be frozen. In the prior art, to continue the play, a relevant operation needs to be clicked manually on a player, for example a click on a Play or Refresh button.

Figure 4:
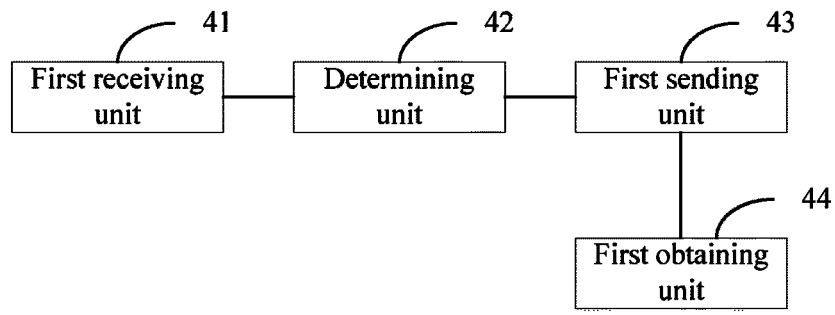
FIG. 4 is a schematic structural diagram of an apparatus for accelerating data transmission according to an embodiment of the present invention.

Based on the implementation process of the foregoing method, an embodiment of the present invention further provides an apparatus for accelerating data transmission. A schematic structural diagram of the apparatus is shown in FIG. 4. The apparatus includes a first receiving unit 41, a determining unit 42, a first sending unit 43 and a first obtaining unit 44. The first receiving unit 41 is configured to receive from a user equipment UE a request to apply for accessing a data file in an external server. The determining unit 42 is configured to: when the first receiving unit 41 receives the request, determine whether a first part of content of the data file is stored in a memory RAN cache of a radio access node. The first sending unit 43 is configured to: when the determining unit 42 determines that the first part of the content of the data file is stored in the RAN cache, send the first part of the content to the UE. The first obtaining unit 44 is configured to: when the first sending unit 43 sends the first part of the content to the UE, obtain a rest second part of the content of the data file from the external server. The first sending unit 43 is further configured to: after the first part of the content is sent to the UE, continue to send the second part of the content obtained by the first obtaining unit 44 to the UE.

Figure 5:
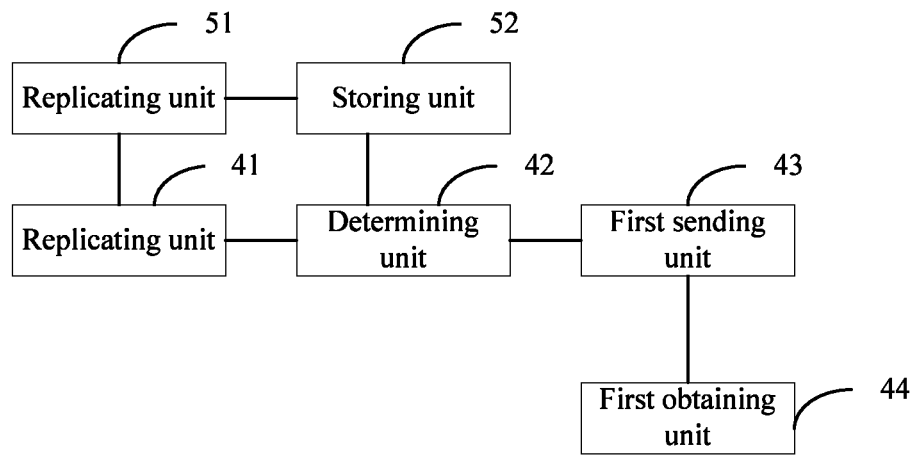
FIG. 5 is another schematic structural diagram of an apparatus for accelerating data transmission according to an embodiment of the present invention.

Optionally, the apparatus may further include a replicating unit 51 and a storing unit 52, with a schematic structural diagram shown in FIG. 5. FIG. 5 is a second schematic structural diagram of an apparatus for accelerating data transmission according to an embodiment of the present invention. The replicating unit 51 is configured to: before the first receiving unit 41 receives from the user equipment UE the request to apply for accessing the data file in the external server, replicate a first part of content of at least one data file stored in the external server, and define other content in the data file than the first part of the content as a second part of the content. The storing unit 52 is configured to store the first part of the content replicated by the replicating unit 51 and a uniform resource locator URL corresponding to the data file in the RAN cache. A size of the first part of the content is generally less than a size of the second part of the content, and definitely, the size of the first part of the content may also be equal to the size of the second part of the content, which is not limited in this embodiment.

Figure 6:
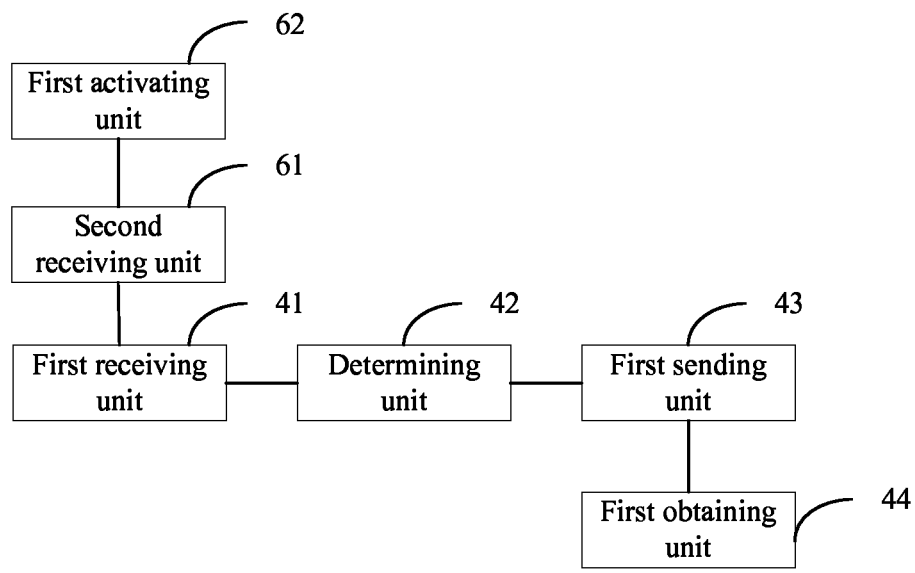
FIG. 6 is still another schematic structural diagram of an apparatus for accelerating data transmission according to an embodiment of the present invention.

Optionally, the apparatus may further include a second receiving unit 61 and a first activating unit 62, with a schematic structural diagram shown in FIG. 6. FIG. 6 is a third schematic structural diagram of an apparatus for accelerating data transmission according to an embodiment of the present invention. FIG. 6 is based on the embodiment shown in FIG. 4. The second receiving unit 61 is configured to: before the first receiving unit 41 receives from the user equipment UE the request to apply for accessing the data file in the external server, receive a first TCP connection request sent by the UE to the external server. The first activating unit 62 is configured to activate a Transmission Control Protocol TCP proxy and act as a proxy of the external server to send a first TCP connection response to the UE.

Optionally, the apparatus may further include a second obtaining unit, a matching unit and a judging unit. The second obtaining unit is configured to: after the first receiving unit receives from the user equipment UE the request to access the data file in the external server, or after the second receiving unit receives the first TCP connection request sent by the UE to the external server, calculate a URL corresponding to the data file according to the request to access the data file in the external server. The matching unit is configured to respectively match the URL of the data file that is obtained by the second obtaining unit with stored URLs corresponding to multiple data files, and send a matching result to the judging unit, or send unmatching determining to the first obtaining unit. The judging unit is configured to: when receiving the result indicating that the matching is successful and sent by the matching unit, determine whether content of the data file requested and corresponding to the URL is stored in the RAN cache, and send a determining result that the content is stored to the first sending unit, or send a determining result that the content is not stored to the first obtaining unit.

The first sending unit is further configured to: when receiving the determining result of the judging unit, send the content of the data file stored in the RAN cache and corresponding to the URL to the UE. The first obtaining unit is further configured to: when receiving the unmatching result sent by the matching unit, or when receiving the determining result that the content is not stored which is sent by the judging unit, download the data file corresponding to the URL from the external server. The second sending unit is further configured to transmit the data file downloaded by the first obtaining unit and corresponding to the URL to the UE.

The judging unit specifically includes a header information judging unit, a determining unit and a position judging unit. The header information judging unit is configured to determine whether the request includes Range header information. The determining unit is configured to: when the header information judging unit determines that the request does not include the Range header information, determine that the content of the requested data file is in the RAN cache. The position judging unit is configured to: when the header information judging unit determines that the request includes the Range header information, continue to determine whether a start download position indicated by information following the Range is less than a size of a stored start part of the data file; and if the start download position is less than the size of the stored start part of the data file, determine that the content of the requested data file is within content stored in the RAN cache; and if the start download position is greater than the size of the stored start part of the data file, determine that the content of the requested data file is not within content stored in the RAN cache.

The apparatus may further include a second activating unit and a third receiving unit. The second activating unit is configured to: before the first obtaining unit downloads the data file corresponding to the URL from the external server, activate an HTTP transparent proxy and send a second TCP connection request to the external server. The third receiving unit is configured to receive a second TCP connection response sent by the external server to the second TCP connection request.

Optionally, the apparatus may further include a third obtaining unit and a third sending unit. The third obtaining unit is configured to: when the judging unit determines that the first part of the content of the data file is not stored in the memory RAN cache of the radio access node, obtain all content of the data file from the external server. The third sending unit is configured to transmit all the content of the data file that are obtained by the third obtaining unit to the UE.

Optionally, the apparatus may further include: a first storing unit, configured to store the first part of the content of the data file obtained from the external server and a uniform resource locator URL corresponding to the data file obtained from the external server, where the first part of the content is a start part of the content or an entirety of the data file obtained from the external server.

The apparatus may further include a fourth obtaining unit and a second storing unit. The fourth obtaining unit is configured to: when the request to access the data file in the external server is received from the UE, obtain metadata of the data file. The second storing unit is configured to store the metadata of the data file that is obtained by the fourth obtaining unit in the RAN cache.

Optionally, the apparatus may be integrated into a node corresponding to the RAN cache, where the node corresponding to the RAN cache may be a BSC, an RNC, or an eNodeB in a 3GPP system, or an AP, a BTS, or a BS in a non-3GPP system, but is not limited thereto. The node may be other similar network elements and is limited in the embodiment of the present invention.

In the embodiment of the present invention, the apparatus adopts a partial storage technology, where a part of content of a data file stored in an external server is replicated and the replicated part of content of the data file is stored in an RAN cache, while the other part of content of the data file and the entire data file are still stored in the external server. In other words, only a start part of the data file stored in the external server is replicated to the RAN cache while entire content of the data file (which definitely include a second part of the content of the data file) is still stored in the external server. Using such manner of caching a part of data increases the quantity of data files that are stored in the RAN cache. When the RAN cache transmits the stored part of data content to a user, the RAN cache also obtains the rest data content of the data file from the external server.

Because a communication bandwidth between the RAN cache and the external server is usually greater than the air interface transmission rate, so long as the data of the external server has reached the RAN cache before the UE completes downloading the part of the data provided by the RAN cache and after the previous part of the data is transmitted to the UE, the other part of the data continues to be transmitted to the UE; therefore, temporary stop (that is, commonly known as freeze) will not occur on playing of the data on the UE. In addition, because the RAN cache is nearer to the UE, a delay of communication between them is shorter. This avoids the problem of a long initial play delay in playing mobile data, improves user satisfaction, and enhances user experience.

Figure 7:
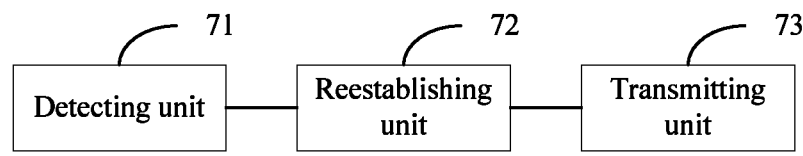
FIG. 7 is a schematic structural diagram of a data transmitting apparatus according to an embodiment of the present invention.

Based on the implementation process of the foregoing method, an embodiment of the present invention further provides another data transmitting apparatus, with a schematic structural diagram shown in FIG. 7. The apparatus includes a detecting unit 71, a reestablishing unit 72, and a transmitting unit 73. The detecting unit 71 is configured to: in a process of handing over a user equipment UE from a memory (RAN cache) node of a memory-equipped source radio access node to a target RAN cache node, detect whether a Transmission Control Protocol TCP connection for downloading a data file or a part of content of a data file from an external server is released. The reestablishing unit 72 is configured to: when the detecting unit detects that the TCP connection for downloading a data file is released, reestablish a TCP connection with the external server. The transmitting unit 73 is configured to continue to download the data file or rest content of the part of the content of the data file from the external server by using the TCP connection established by the reestablishing unit.

Figure 8:
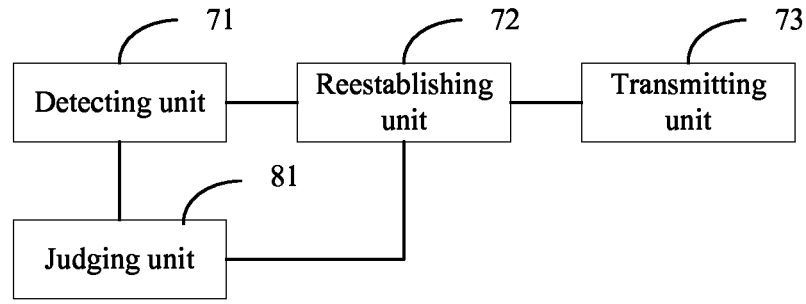
FIG. 8 is another schematic structural diagram of a data transmitting apparatus according to an embodiment of the present invention.

Optionally, the apparatus may further include a judging unit 81, with a schematic structural diagram shown in FIG. 8. FIG. 8 is a second schematic structural diagram of a data transmitting apparatus according to an embodiment of the present invention. The judging unit 81 is configured to: when the detecting unit 71 detects that the TCP connection for downloading a data file or a part of the content of the data file from the external server is in a released state, determine whether the data file or the part of the content of the data file is completely downloaded and send a determining result that downloading is incomplete to the reestablishing unit. The reestablishing unit is further configured to: when receiving the determining result that downloading is incomplete which is sent by the judging unit, reestablish the TCP connection with the external server.

The judging unit is specifically configured to: when the detecting unit detects that the TCP connection for downloading a data file or a part of the content of the data file is in a released state compare to determine whether a size of downloaded content of the data file is greater than a size of the data file, if the size of the downloaded content of the data file is greater than or equal to the size of the data file, determine that the content of the data file is completely downloaded, and if the size of downloaded content of the data file is less than the size of the data file, determine that the content of the data file is not completely downloaded and send a determining result that downloading is incomplete to the reestablishing unit; or compare to determine whether a size of the downloaded part of the content of the data file is greater than a size of the data file, if the size of the downloaded content of the data file is greater than or equal to the size of the data file, determine that the part of the content of the data file is completely downloaded, and if the size of the downloaded part of the content of the data file is less than the size of the data file, determine that the part of the content of the data file is not completely downloaded and send a determining result that downloading is incomplete to the reestablishing unit.

In the embodiment of the present invention, when it is detected that a TCP connection is released, a TCP connection with an external server connected to the target RAN cache node is reestablished and the data file or rest content of the part of the content of the data file continue to be downloaded by using the reestablished TCP connection. This solves the technical problem that data cannot be normally played (that is, frozen) when the UE moves to another RAN node and therefore improves user experience.

Figure 9:
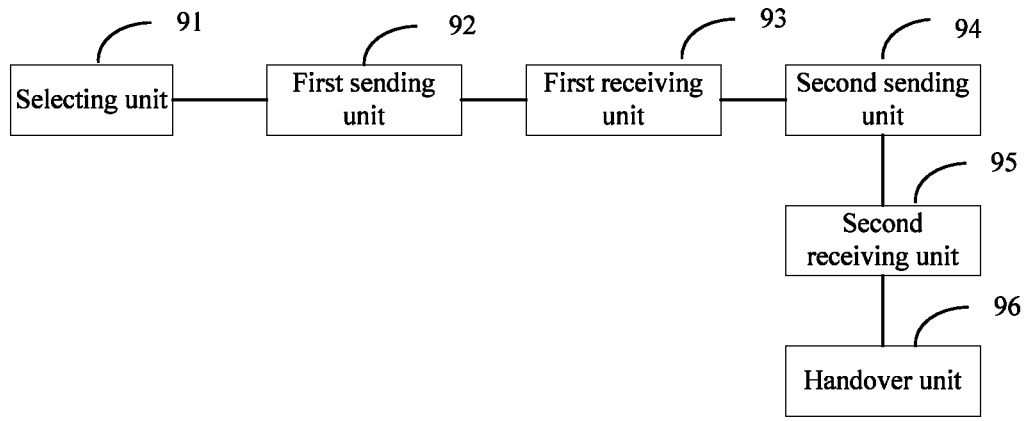
FIG. 9 is a schematic structural diagram of a handover apparatus according to an embodiment of the present invention.

Accordingly, an embodiment of the present invention further provides a handover apparatus, with a schematic structural diagram shown in FIG. 9. The handover apparatus includes a selecting unit 91, a first sending unit 92, a first receiving unit 93, a second sending unit 94, a second receiving unit 95, and a handover unit 96. The selecting unit 91 is configured to select a memory-equipped target radio access (RAN cache) node for a UE that requires handover. The first sending unit 92 is configured to: when a Transmission Control Protocol TCP connection exists between the handover apparatus and an external server, send a TCP connection release command to the external server, where the command includes a TCP FIN flag or a TCP RST flag but is not limited thereto.

The first receiving unit 93 is configured to receive a TCP reply packet for releasing the TCP connection sent by the external server. The second sending unit 94 is configured to: when the first receiving unit receives the TCP reply packet for releasing the TCP connection, send a TCP connection release command to the UE. The second receiving unit 95 is configured to receive a TCP reply packet for releasing the TCP connection sent by the UE. The handover unit 96 is configured to send a handover command to the UE, instructing the UE to hand over to the target RAN cache node.

Figure 10:
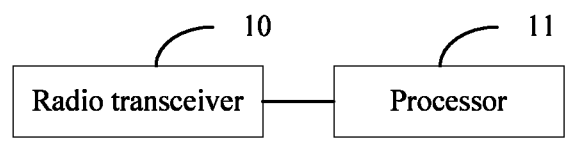
FIG. 10 is a schematic structural diagram of a radio access node according to an embodiment of the present invention.

Based on the above embodiment, an embodiment of the present invention further provides a radio access node, with a schematic structural diagram shown in FIG. 10. The radio access node includes a radio transceiver 10 and a processor 11. The radio transceiver 10 is configured to receive from a user equipment UE a request to access a data file in an external server. The processor 11 is configured to: when the radio transceiver receives the request, determine whether a first part of content of the data file is stored in a memory of the radio access node, an RAN cache; when the first part of the content is stored, transmit the first part of the content to the radio transceiver, when the first part of the content is transmitted to the radio transceiver, obtain a rest second part of the content of the data file from the external server; and transmit the second part of the content to the radio transceiver. The radio transceiver 10 is further configured to: after the first part of the content sent by the processor is received, transmit the first part of the content to the UE; and after all the first part of the content is transmitted, continue to transmit the second part of the content to the UE.

Optionally, the processor is further configured to: before the request to access the data file in the external server is received from the user equipment UE, receive a first TCP connection request sent by the UE to the external server, and activate a TCP proxy and act as a proxy of the external server to send a first TCP connection response to the radio transceiver. The radio transceiver is further configured to send the received first TCP connection response to the UE.

Optionally, the processor is further configured to: after the request to access the data file in the external server is received from the user equipment UE, or after the first TCP connection request sent by the UE to the external server is received, calculate a URL corresponding to the data file according to the request to access data file in the external server; respectively match the calculated URL with stored URLs corresponding to multiple data files; if the matching is successful, determine whether content of the data file requested and corresponding to the URL is stored in the RAN cache; if the content is stored in the RAN cache, send the content of the data file stored in the RAN cache and corresponding to the URL to the UE; and if the matching is unsuccessful or the content is not stored in the RAN cache, download the data file corresponding to the URL from the external server and send the data file corresponding to the URL to the radio transceiver. The radio transceiver is further configured to transmit the data file received and corresponding to the URL to the UE.

Figure 11:
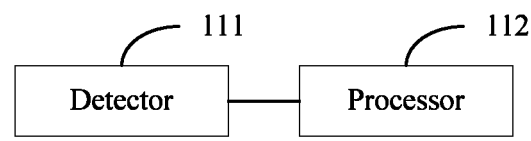
FIG. 11 is a schematic structural diagram of another radio access node according to an embodiment of the present invention.

Based on the above embodiment, an embodiment of the present invention further provides another radio access node, with a schematic structural diagram shown in FIG. 11. The radio access node includes a detector 111 and a processor 112. The detector 111 is configured to: in a process of handing over a user equipment UE from a source radio access RAN cache node to a target RAN cache node, detect whether a TCP connection for downloading a data file from an external server is released. The processor 112 is configured to: when the detector detects that the TCP connection is released, reestablish a TCP connection with the external server, and continue to download the data file from the external server by using the reestablished TCP connection.

Optionally, the processor is further configured to: when the detector detects that the TCP connection for downloading a data file is released, determine whether the data file is completely downloaded, if the data file is not completely downloaded, reestablish the TCP connection with the external server, and otherwise, determine that the TCP connection for downloading a data file is released normally.

Accordingly, an embodiment of the present invention further provides a data transmitting system. The system includes a user equipment UE, a memory-equipped radio access RAN cache node, and a external server. The UE is configured to request to apply for accessing a data file in the external server, and receive the data file sent by the RAN cache node. The RAN cache node is configured to: after receiving from the UE the request to apply for accessing a data file in the external server, if it is determined that a first part of content of the data file is stored in a memory of the radio access node, an RAN cache, transmit the first part of the content to the UE; when transmitting the first part of the content to the UE, request with the external server to obtain a rest second part of the content of the data file; receive the rest second part of the content of the data file that is sent by the external server; and after all the first part of the content is transmitted to the UE, continue to transmit the second part of the content to the UE. The external server is configured to: when receiving from the RAN cache node the request to obtain the rest second part of the content of the data file, send the rest second part of the content of the data file to the RAN cache node.

For the implementation processes of functions and purposes of the devices in the system, refer to the foregoing corresponding processes, which will not be described here again.

Accordingly, an embodiment of the present invention further provides a data transmitting system. The system includes a user equipment (UE) and an external server.

The user equipment is configured to: in a process of handover from a memory-equipped source radio access RAN cache node to a target RAN cache node, if it is detected that a Transmission Control Protocol TCP connection for downloading a data file or a part of content of a data file from the external server is in a released state, send a TCP connection reestablishment request to the external server and receive a TCP connection response sent by the external server; request with the external server to download the data file or download rest content of the part of the content of the data file by using the established TCP connection; and receive the data file that are sent by the external server or download the rest content of the part of the content of the data file. The external server is configured to receive the TCP connection reestablishment request sent by the user equipment and send the TCP connection response to the UE; and when receiving from the UE the request to download the data file or download the rest content of the part of the content of the data file, send the data file or the rest content of the part of the content of the data file to the UE.

For the implementation processes of functions and purposes of the devices in the system, refer to the foregoing corresponding processes, which will not be described here again.

Accordingly, an embodiment of the present invention further provides a handover system. The system includes a user equipment UE, a memory-equipped source radio access RAN cache node, and an external server. The source RAN cache node is configured to select a memory-equipped target radio access RAN cache node for the user equipment UE that requires handover; when it is determined that a Transmission Control Protocol TCP connection exists between the source RAN cache node and the external server, send a TCP connection release command to the external server by using the TCP connection; when receiving a TCP reply packet for releasing the TCP connection sent by the external server, send a TCP connection release command to the UE; and when receiving a TCP reply packet for releasing the TCP connection sent by the UE, send a handover command to the UE. The external server is configured to receive the TCP connection release command sent by the source RAN cache node, and send the TCP reply packet for releasing the TCP connection to the source RAN cache node. The UE is configured to receive the TCP connection release command sent by the source RAN cache node, send the TCP reply packet for releasing the TCP connection to the source RAN cache node, and when receiving the handover command sent by the source RAN cache node, hand over to the target RAN cache according to the handover command.

For the implementation processes of functions and purposes of the devices in the system, refer to the foregoing corresponding processes, which will not be described here again.

To help a person skilled in the art understand the present invention, the present invention will be described by using specific application examples.

In a first embodiment, a data file stored in an RAN cache is exemplarily a video file. That is to say, an RAN cache normally stores an entire video file of a video in an external Server, while, in the embodiment of the present invention, a partial video file storage technology is adopted, where an RAN cache replicates only a start part of content (that is, a first part of the content) of at least one video file stored in the external Server. When a user accesses this video file in the external Server, the RAN cache finds that it stores the start part (that is, the first part of the content) of the video file and transmits the start part of the video file to the UE immediately, and meanwhile, the RAN cache initiates a connection to the external Server to continue to transmit a video in a rest part of the content (that is, a second part of the content) of the video file.

Because a communication bandwidth between the RAN cache and the external Server is usually greater than a transmission rate between the UE and the RAN cache, so long as the data of the external Server has reached the RAN cache before the UE completes downloading the first part of the video provided by the RAN cache, temporary stop (that is, commonly known as freeze) will not occur on playing of the video on the UE. Because the RAN cache is nearer to the UE, a delay of communication between them is shorter. This solves an initial play delay in playing a mobile video. In addition, because the RAN cache only needs to store a start part of a video file instead of the entire video file, with a same storage space, one RAN cache can store much more video files with only their start parts of content.

When a user clicks videos, because start parts of content of many video files have been stored in the RAN cache, the quantity of accelerated videos (that is, a "click-through rate") will be increased greatly. This will bring about an obvious video acceleration effect and obvious enhancement to user experience, thereby solving the problem of limited videos stored in an RAN cache due to the cost and the limited device space, small qualities of videos of which transmission is accelerated, and non-obvious improvement of user experience.

In addition, obviously, the RAN cache stores only a start part of a video file, and when the RAN cache returns a response to a video downloading request of a UE, complete metadata information about the video file still needs to be provided, for example, size of the entire video file, last modified time, eTag tag, and so on.

Figure 12:
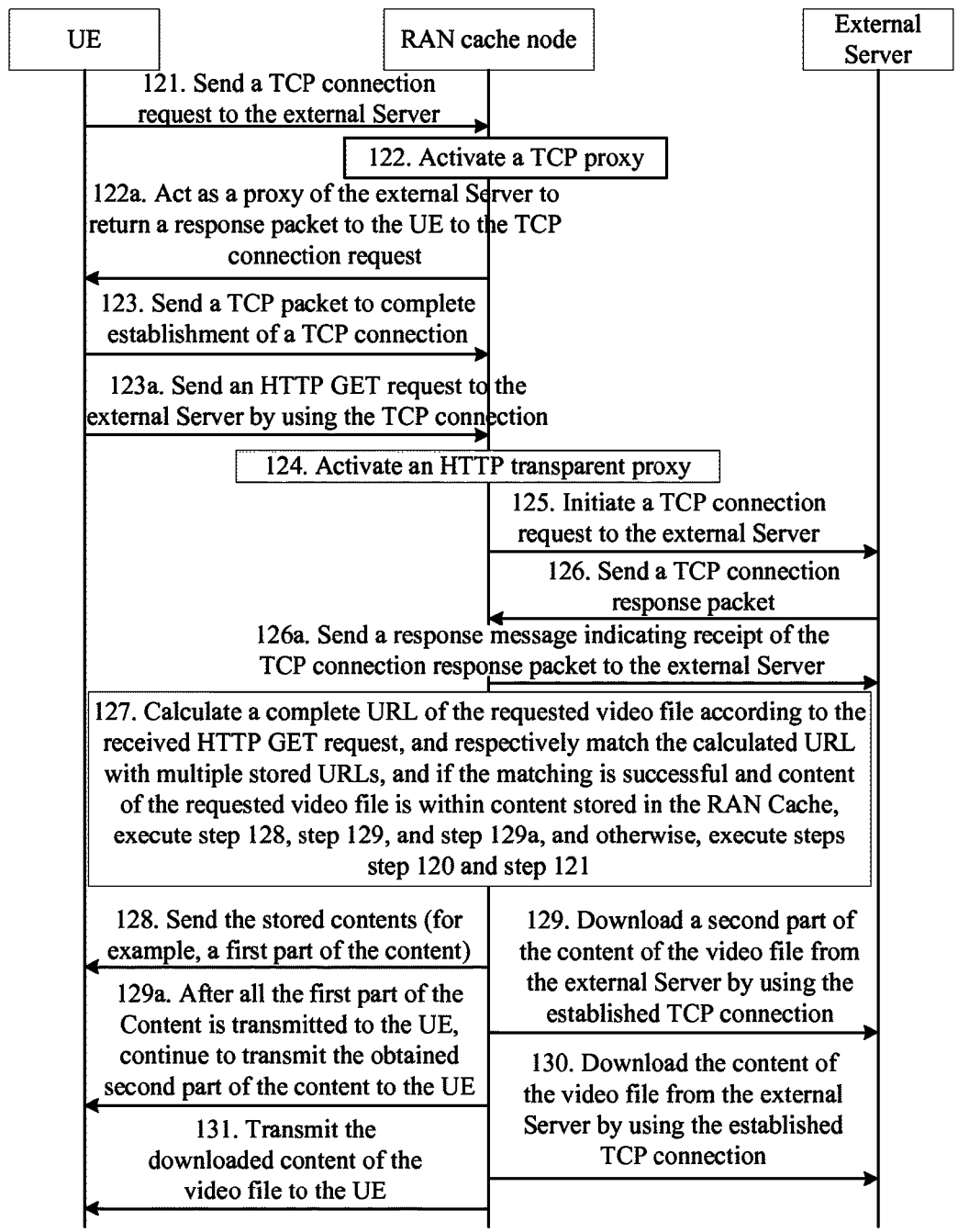
FIG. 12 is a flowchart of an application example of a method for accelerating data transmission according to an embodiment of the present invention.

Referring to FIG. 12, FIG. 12 is a first application example of a method for accelerating data transmission according to an embodiment of the present invention. The embodiment is described by using video transmission as an example and specifically includes the following steps.

Step 121: A UE sends a TCP connection request to an external Server through an RAN cache node, where, in the TCP connection request, a source IP address is an IP address of the UE and a destination IP address is an IP address of the external Server. Obviously, the TCP connection request includes a TCP SYN flag.

In this embodiment, the UE is not aware whether the RAN cache adopts a partial video storage manner or an existing manner of storing an entire video file, and the UE is not aware whether the RAN node uses a cache function either. Generally, the user clicks a video link on an external Server to view the video.

Step 122: After receiving the TCP connection request, the RAN cache node activates a TCP proxy.

Step 122a: The RAN cache node acts as a proxy of the external Server to send a TCP connection response packet to the UE, where the TCP connection response packet includes a TCP SYN flag and a TCP ACK flag, and, in the TCP connection response packet, a source IP address is the IP address of the external Server and a destination IP address is the IP address of the UE.

In other words, in this step, if the RAN cache activates a partial storage function, the RAN cache activates a TCP proxy (TCP Proxy) function and will act as a proxy of the external Server to return a response packet to the TCP connection request of the UE, in this case, the source IP address and the destination IP address in the TCP connection response packet are respectively the destination IP address and the source IP address in step 121, and the TCP connection response packet includes the TCP SYN flag and the TCP ACK flag.

Step 123: The UE sends a TCP packet to the RAN cache node to complete establishment of a TCP connection, where a source IP address and a destination IP address in the TCP packet are the same as the source IP address and the destination IP address in step 121.

It should be noted that steps 121 to 123 are the commonly said three-way handshake steps of a TCP connection, the purpose of which is to establish the TCP connection.

Step 123a: The UE sends an HTTP GET request to the external Server over the HTTP protocol by using the established TCP connection through the RAN cache node, where the HTTP GET request includes a URL corresponding to the video file in the external Server. One HTTP GET request sent by the UE is but is not limited to the following:

GET /Multimedia/Movie.3gp HTTP/1.1\r\n
Accept: */*\r\n
Accept-Language: zh-CN\r\n
Referer: http://www.server.com/Multimedia/Movie.3gp \r\n
Accept-Encoding: gzip, deflate\r\n
User-Agent: Mozilla/4.0 (compatible; MSIE7.0; WindowsNT 6.1; .NET4.0C; .NET4.0E)\r\n
Host: www.server.com\r\n
Connection: Keep-Alive\r\n In the HTTP GET message, the HTTP Host message header indicates a domain name of the external Server, for example, www.server.com, a GET command includes a local URL, for example, /Multimedia/Movie.3gp. According to the Host and the GET command, the RAN cache can acquire a complete URL of the video file, that is, http://www.server.com/Multimedia/Movie.3gp.

Optionally, to accelerate video downloading, step 123a and step 121 may be executed simultaneously.

Step 124: After receiving the HTTP GET request, the RAN cache node activates an HTTP transparent proxy (HTTP Transparent Proxy) function.

Step 125: The RAN cache node initiates a TCP connection request to the external Server, where, in the TCP connection request, a destination IP address and a destination TCP port number are respectively the same as those of corresponding data in step 121, and a source IP address is normally an IP address of the RAN cache node itself or may be the IP address of the UE.

In other words, in step 124 and step 125, if the RAN cache node has implemented the partial storage function and knows from the HTTP message in step 123a that the previous step is for establishment of a TCP connection of the HTTP, the RAN cache node activates the HTTP transparent proxy function. That is to say, the RAN cache node initiates a TCP connection request to the external Server according to the IP address information acquired in step 121, where a destination IP address and a destination TCP port number are respectively the same as those of corresponding data in step 121, and a source IP address is normally the IP address of the RAN cache node itself or may be the IP address of the UE.

Optionally, in another embodiment, destination TCP ports of TCP connections used by the HTTP are all port 80/8080. If the destination TCP port of the TCP connection request obtained in step 121 is port 80 or port 8080, the RAN cache node activates the HTTP transparent proxy function, which means that step 124 is executed directly. That is to say, step 124 may be executed directly after step 121 instead of being executed after step 123.

Step 126: The external Server sends a TCP connection response packet to the RAN cache node and the TCP connection is established successfully, where the TCP connection response packet includes a TCP SYN flag and a TCP ACK flag, and in the TCP connection response packet, a source IP address, a destination IP address, a source TCP port, and a destination TCP port respectively correspond to the destination IP address, the source IP address, the destination TCP port, and the source TCP port in the connection request in step 124.

Step 126a: The RAN cache node sends a response message indicating receipt of the TCP connection response packet to the external Server.

Step 127: The RAN cache node calculates a complete URL of the requested video file according to the received HTTP GET request (that is, step 123a), and respectively matches the calculated URL with multiple stored URLs, and if the matching is successful and content (for example, a first part of the content) of the requested video file is within content stored in the RAN cache, executes step 128, step 129, and step 129a; and otherwise, executes step 130 and step 131.

Step 126a and step 124 may be executed simultaneously or sequentially; and step 126a and step 127 are not subject to an order of time and they may also be executed simultaneously, which is not limited in this embodiment.

In this step, the calculated URL is respectively compared with multiple stored URLs. In other words, the calculated URL is compared to determine whether a video file stored in the RAN cache corresponds to the URL. (Note: when the RAN cache stores an entire video file or stores a start part of the video file, the RAN caches also needs to record a complete uniform resource locator URL, Uniform Resource Locator, corresponding to the video file).

Generally, when the UE downloads a file (including a video file), the downloading will start from the beginning of the file. However, the current HTTP protocol supports resumable upload, which means downloading of a file can start from any position of the file. This technology is often used by downloaders to divide one file into a plurality of segments and download the segments simultaneously, so as to accelerate the downloading of the file. When the resumable upload is adopted, Range header information in the HTTP protocol is used. When one segment of a file is downloaded, Range: bytes=start download position–end position\r\n. When the download end position is the end of the file, there may be no download end position included. For example, GET /Multimedia/Movie.3gp HTTP/1.1\r\n
Accept: */*\r\n
Range: bytes=641-\r\n
Accept-Language: zh-CN\r\n
Referer: http://www.server.com/Multimedia/Movie.3gp \r\n
Accept-Encoding: gzip, deflate\r\n
User-Agent: Mozilla/4.0 (compatible; MSIE7.0; WindowsNT 6.1; .NET4.0C; .NET4.0E)\r\n
Host: www.server.com\r\n
Connection: Keep-Alive\r\n After the RAN cache node calculates the complete URL in step 123a, and respectively matches the calculated URL with the multiple stored URLs, the RAN cache node checks whether the GET request in the HTTP protocol includes the Range header information.

If the GET request does not include the Range header information, it indicates that the downloading starts from the beginning of the video file, and that the requested video content is content stored in the RAN cache. Then, the RAN cache transmits video data to the UE, starting from the stored beginning of the video file.

If a Range header is included, information following the Range header is compared.

If the indicated start download position is less than a size of the stored start part of the video file, the request video content is content stored in the RAN cache, and therefore the RAN cache transmits video data to the UE, starting from the position indicated by the Range of the stored video content.

For example, a size of one video file is 4.2 GB, and the RAN cache stores a start part of 3.6 MB, of the video file. When the Range in the GET requested by the UE is bytes=641-\r\n, where obviously, 641<3.6 M, the RAN cache transmits video data to the UE, starting from byte 641 of the stored video file.

If the indicated start download position is greater than the size of the stored start part of the video file, the request video content is content not stored in the RAN cache, and therefore the RAN cache needs to download video data from the external Server from the position indicated by the Range, and then transmits the video data to the UE.

In other words, when the RAN caches transmits video data by using HTTP protocol, a header message of a response in the HTTP protocol includes some metadata information of the video file, for example, the entire size of the video file, last modified time of the video file, eTag tag, and so on. The RAN cache includes the data information in the header message according to metadata information stored and related to the video file. The metadata information is consistent with regard to one video file and will not change with the size of the video file (partially stored or completely stored) stored in the RAN Cache Step 128: The RAN cache node sends the stored content (for example, the first part of the content) to the UE.

Step 129: The RAN cache node downloads a second part of the content of the video file from the external Server by using the established TCP connection.

Step 129a: After the RAN cache node completely transmits the stored first part of the content to the UE, the RAN cache node continues to transmit the obtained second part of the content. That is to say, before the first part of the content of the video file is completely transmitted to the UE, the second part of the content of the video file has been obtained from the external server.

In other words, after the RAN cache node and the external Server establish the TCP connection, when the URL requested by the UE and calculated by the RAN cache node in step 127 matches the URL of the stored video file, and the requested video content is within the content stored in the RAN cache, the RAN cache node requests subsequent video data of the stored video file from the external Server (that is, sending an HTTP message) as follows:

GET /Multimedia/Movie.3gp HTTP/1.1\r\n
Accept: */*\r\n
Range: bytes="size of the start part of Movie.3gp stored in the RAN cache"-\r\n
Accept-Language: zh-CN\r\n
Referer: http://www.server.com/Multimedia/Movie.3gp \r\n
Accept-Encoding: gzip, deflate\r\n
User-Agent: Mozilla/4.0 (compatible; MSIE 7.0; Windows NT 6.1; .NET4.0C; .NET4.0E)\r\n
Host: www.server.com\r\n Connection: Keep-Alive\r\n It should be noted that, in the HTTP protocol, the first byte of a file is identified as 0, and therefore the start position in the above Range header information is a "size of a start part of Movie.3gp stored in the RAN cache" rather than the "size of the start part of Movie.3gp stored in the RAN cache+1".

Step 130: If the URL is not matched or if the requested video content is not within the content stored in the RAN cache, the RAN cache node downloads the content of the video file from the external Server by using the established TCP connection. In other words, the UE sends an HTTP GET request to the external Server over the HTTP protocol by using the established TCP connection, where the request includes the URL corresponding to the video file in the external Server. The HTTP message sent by the UE is as described as above and will not be described here again.

Step 131: The RAN cache node transmits the downloaded content of the video file to the UE.

In step 130 and step 131, the RAN cache node receives the video data sent by the external Server by using an HTTP Session established with the external Server and the RAN cache node sends the video data to the UE by using an HTTP Session established with the UE.

In this embodiment, if the RAN cache stores the video data required by the UE, and after transmitting all stored video data by using the HTTP Session established with the UE, the RAN cache node transmits the video data to the UE, which is downloaded from the external Server by using the HTTP Session established with the external Server. All these operations are transparent to the UE, which is the HTTP transparent proxy.

An HTTP nontransparent proxy means manual setting of an HTTP proxy server and a port number on an HTTP Client (that is, an HTTP Browser) on the UE. Often, for IE Browsers inside a corporate to access an external website, an HTTP proxy must be set.

Optionally, in the above application example, to solve the problem of ensuring that temporary discontinuity will not occur during the transmission of video data between the RAN cache and the UE while the quantity of video files stored in the RAN cache is increased, if the RAN cache stores the video data required by the UE, after transmitting all the stored video data to the UE, the RAN cache node continues to transmit the video data downloaded from the external Server to the UE. However, it is possible that, after the RAN cache node transmits all the stored video data (that is, the first part of the content), the video data (for example, the second part of the content) downloaded from the external Server has not reached the RAN cache node because of a large data delay between the RAN cache node and the external Server, which results in temporary discontinuity in the video data transmission between the RAN cache node and the UE and possibly temporary freeze of the video played on the UE. To solve the problem, a reliable method provided in an embodiment of the present invention is to increase the size of the first part (start part) of the content of the video file stored in the RAN cache. However, if the size is too large, the quantity of stored video files will drop; and if the size of the stored first part (start part) of the content is too small, the video played on the UE may be frozen temporarily. Therefore, the size of the video file stored in the RAN cache may be obtained by using the following formula, and the calculation formula is:

smallest storage space for each video file=time interval from when the RAN cache node sends a TCP connection request to the external Server to when the RAN cache node receives the first video data packet from the external Server× video bit rate.

The time interval from when the RAN cache node sends a TCP connection request to the external Server to when the RAN cache node receives the first video data packet from the external Server=time of 3 TCP connection handshakes+ GET request+GET response=5×One-way delay=2.5×RTT.

That is to say, the smallest storage space for each video file=2.5×RTT×video bit rate. The RTT is a round trip time for data transmission between the UE and the external server, and the video bit rate is a bit rate (bit rate) of video data under a designated normal play rate (for example, 25 frames per second) of the video.

For example, there is a hard disk of 500 GB on the RAN node, which can store 194 (500/4.2=194.55) 720p movies (calculated as 2.57 GB). If the separate storage technology provided by the present invention is adopted, 500000/ 2.85=175438 movies can be stored.

In other words, if this embodiment is adopted, assuming that 2.5×RTT=6 s (in most circumstances, the initial play time of a video is less than 6 s), the normal play rate of a 720p movie (1024×720, 30p, 4:2:0, 70 times compression) is 3.8 mbps (1024×720×12×30/70=3791726) and therefore, for a 720p movie, a storage space required in the RAN cache is 6×3.8 mb/8=2.85 MB. If the RAN cache provides a storage space of 500 GB, the RAN cache can store 500000/ 2.85=175438 movies. Compared with 194 movies that can be stored in a hard disk of 500 GB, the quantity of stored movies is approximately 904 (175438/194=904.320) times of the original quantity. Obviously, the value 175438 indicates that the RAN Cache can ensure that almost all movies that can be currently downloaded by users can be partially stored. Therefore, it can be ensured that the downloading of almost all videos by users can be accelerated when the users currently download the videos. That is to say, an initial play delay of a video will drop because of the acceleration of downloading of the video content.

Optionally, in the above application example, partial storage of video files is adopted, in an embodiment of the present invention, combined storage of video files may be adopted, where the RAN cache stores partial content of some video files and stores all content of some other video files. In other words, with respect to different video files, different storage sizes are used.

For example, when a video is currently popular, a partial storage space may be far greater than the smallest storage space. When a video is not popular, a partial storage space may be only a little greater than the smallest storage space.

In other words, when one or some videos are very popular, these popular video files may be completely stored in the RAN cache while other video files are partially stored. In other words, in the present invention, some video files may be completely stored in the RAN cache while start parts of some other video files are stored, to form a storage state where some video files are completely stored and some other video files are partially stored. Whatever storage manner is adopted, the RAN cache node still activates the defined TCP proxy and the HTTP transparent proxy. The processing function on the RAN cache node does not change. The only difference is that, after the UE completely downloads a stored entire video file, the RAN cache node no longer initiates a TCP connection or an HTTP Session to the external Server.

It should be noted that, which video files need be completely stored and which video files need be partially stored are decided by an operator or according to the popularity of videos, or according to the commercial cooperation between the operator and the external Server, which is not limited thereto.

In addition, when the RAN cache node receives from a UE a request to download a video file, if the RAN cache node finds that it does not store the video file (for example, the RAN cache node determines by URL matching whether the video file is stored), the RAN cache node stores a start part of the video file. However, some identical video content appears repetitively in different URLs, in this case, the RAN Cache node may compare sizes of the video files or calculate complete Hash values of the video files to determine whether same video files are stored.

In another method, the operator replicates a first part of content of at least one data file stored in the external server by using a specific method (for example, an active insertion method of OAM or CDN), where other content of the at least one data file than the first part of the content is defined as a second part of the content; and the first part of the content and a uniform resource locator URL corresponding to the data file are stored in the RAN cache. The entire content of the video file, however, is still stored in the external server and therefore the second part of the content of the video file is also stored in the external server. To prevent repetitive storage of video files, a video file is stored together with its corresponding URL and whether a same video file is stored is determined by comparing the stored URL. Definitely, the present invention is not limited to such method and repetitive storage may be prevented by calculating Hash values or other methods.

In addition, the RAN cache stores only a start part of a video file, and when the RAN cache returns a response to a video file downloading request of a UE, complete metadata information about the video file still needs to be provided, for example, a size of the entire video file, last modified time, eTag tag, and so on. Similarly, when the RAN cache stores the entire video file, the metadata information also needs to be provided. The metadata information is consistent with regard to one video file and will not change with the size of the video file (partially stored or completely stored) stored in the RAN Cache. Similarly, 1) the RAN cache also obtains metadata of a video file when a UE downloads the video file from the Server; or 2) the operator pre-stores metadata of a video file in the RAN cache by using a specific method (for example, an active insertion method of OAM or CDN).

Figure 13:
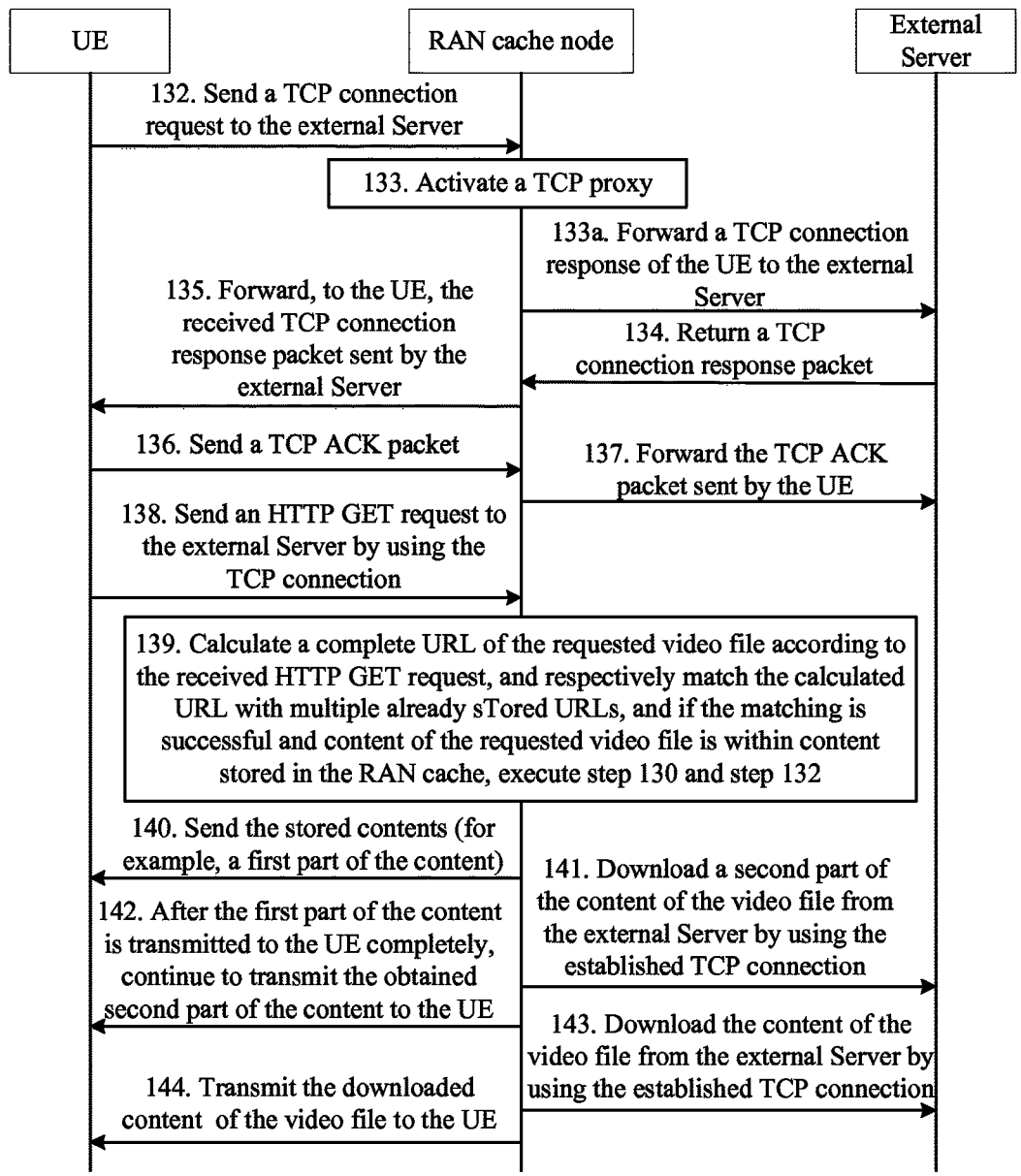
FIG. 13 is a flowchart of another application example of a method for accelerating data transmission according to an embodiment of the present invention.

FIG. 13 illustrates a second application example of the method for accelerating data transmission according to an embodiment of the present invention. The embodiment is also described by using video transmission as an example and specifically includes the following steps.

Step 132: The same as step 131; and for details, refer to the previous description, which will not be described here again.

Step 133: After receiving the TCP connection request, the RAN cache node activates a TCP proxy.

In other words, in this embodiment, because the RAN cache uses a partial storage function, after receiving the TCP connection request, the RAN cache node will activate a TCP proxy (TCP Proxy) function.

Step 133*a*: The RAN cache node forwards a TCP connection establishment request of the UE to the external server.

This means that content of the TCP connection request packet sent by the UE is not modified.

Step 134: After receiving the TCP connection request, the external Server returns a TCP connection response packet to the RAN cache node.

Step 135: The RAN cache node forwards, to the UE, the received TCP connection response packet sent by the external Server.

Step 136: After receiving the TCP connection response packet, the UE sends a TCP acknowledgment ACK packet to the RAN cache node, where a source IP address and a destination IP address are the same as the source IP address and the destination IP address in step 131.

Step 137: The RAN cache node forwards, to the external Server, the TCP ACK packet sent by the UE, where the source IP address and the destination IP address are the same as the source IP address and the destination IP address in step 131.

Steps 131 to 137 are the commonly said three-way handshake steps of a TCP connection.

Step 138: The same as step 123*a*, that is, the UE sends an HTTP GET request to the RAN cache node over the TCP connection, in other words, the UE sends an HTTP GET request to the external Server over the HTTP protocol through the RAN cache node. For details, refer to the previous description, which will not be described here again.

Step 139: The same as step 127, that is, the RAN cache node calculates a complete URL of the requested video file according to the received HTTP GET request, and respectively matches the calculated URL with multiple stored URLs, and if the matching is successful and content of the requested video file is within content stored in the RAN cache, executes steps 140 to 142. For details, refer to the previous description, which will not be described here again.

Preferably, to accelerate video downloading, messages in step 136 and step 138 may be combined and sent in one message.

Steps 140 to 142: The same as steps 128 to 129*a*.

Steps 143 to 144: The same as steps 130 to 131.

That is to say, the RAN cache node receives, by using the HTTP Session established with the external Server, the video data sent by the external Server and the RAN cache node sends the video data to the UE by using the HTTP Session established with the UE.

In this embodiment, if the RAN cache stores the video data required by the UE, and after transmitting all stored video data by using the HTTP Session established with the UE, the RAN cache node transmits the video data to the UE, which is downloaded from the external Server by using the HTTP Session established with the external Server. All these operations are transparent to the UE, which is the HTTP transparent proxy.

In the preceding embodiments, it is disclosed that a part of content of at least one video file in an external server is stored in an RAN cache, which means that video files are stored by using a partial storage method; and it is also disclosed that a part of content of at least one video file in an external server is stored in an RAN Cache and meanwhile at least one other video file stored in the external server is stored in the RAN cache in entirety, which means that video files are stored by using a complete storage method and a partial storage method. In the above storage manners, however, whatever storage manner is adopted, a TCP connection and an HTTP Session are established between a UE and the RAN cache node (it should be noted that the UE thinks that the TCP connection and the HTTP Session are established with the external Server while actually with the RAN cache node, and this is because the RAN cache performs TCP proxy and HTTP transparent proxy operations for the TCP connection and the HTTP Session of the UE, and the UE is unaware of these operations).

In another embodiment, when a video is played, if the UE moves to another RAN cache node, the TCP connection of the UE with an original RAN cache node cannot be ensured, which results in the phenomenon of freeze of the video. In other words, the video playing will stop automatically but playing of a subsequent part of the video can by no means start automatically. In this case, in the prior art, to continue the play, a relevant operation needs to be clicked manually on a player, for example, a click on a Play or Refresh button. Obviously, this has serious impacts on user experience in watching a video. To solve the problem that a video is frozen when a UE moves after introduction of the RAN cache, the embodiment provides the following technical solution.

Figure 14:
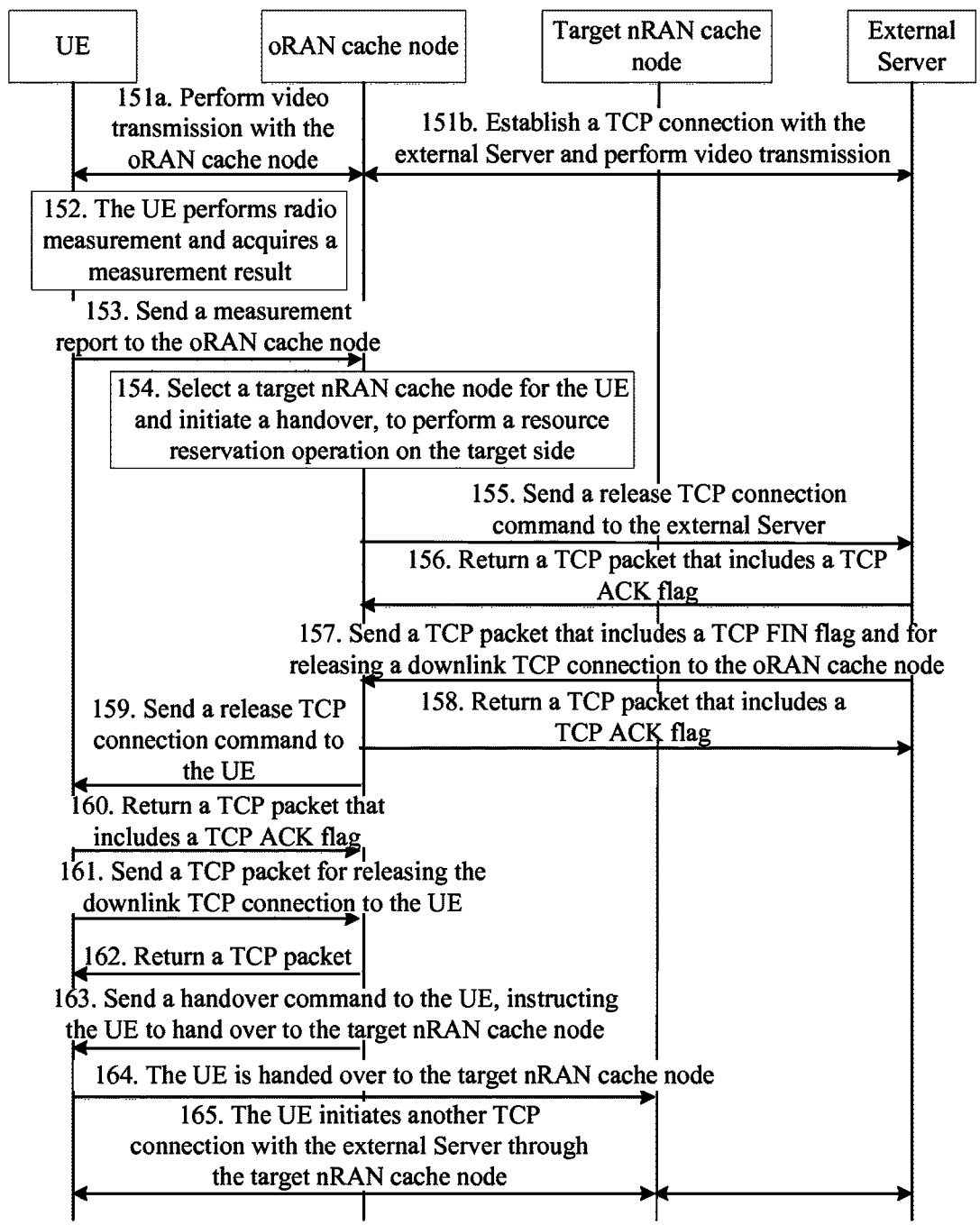
FIG. 14 is a flowchart of still another application example of a method for accelerating data transmission according to an embodiment of the present invention.

Referring to FIG. 14, FIG. 14 is a third application example of the method for accelerating data transmission according to an embodiment of the present invention. The embodiment is also described by using video transmission as an example and specifically includes the following steps.

Step 151a: A UE and an old RAN cache node (represented by oRAN cache node, that is, a source RAN cache node) perform video transmission.

Step 151b: The oRAN cache node and an external Server establish a TCP connection and perform video transmission.

In other words, in step 151a and step 151b, the UE plays a video file and the TCP connection is established between the UE and the old RAN cache node. If the video file accessed by the UE is not stored in the oRAN cache in entirety, the oRAN cache node establishes the TCP connection with the external Server and the oRAN cache node activates an HTTP Transparent Proxy. If the video file accessed by the UE is stored in the oRAN cache in entirety, the oRAN cache node has no TCP connection with the external Server and therefore, does not activate the HTTP Transparent Proxy.

Step 152: The UE performs radio measurement and acquires a measurement result.

Step 153: The UE sends a measurement report to the oRAN cache node.

Step 154: The oRAN cache node selects a target RAN cache node for the UE and initiates a handover, so that the target side performs a resource reservation operation for the handover. This process is an existing standard process. Because of the various forms of handover, not all nodes involved in the handover process are shown in the figure. In this embodiment, it is assumed that a target node of handover is an nRAN cache node.

Step 155: After the resource reservation operation on the network side for the handover is successful, if a TCP connection exists between the oRAN cache node and the external Server, the oRAN cache node sends a TCP connection release command, for example, a TCP packet that includes a TCP FIN flag or a TCP RST flag, to the external Server.

Step 156: When the external Server receives the TCP packet for releasing the TCP connection that includes a TCP FIN flag and is sent by the oRAN cache node, the external Server sends a TCP packet that includes a TCP ACK flag in response to the oRAN cache node.

Step 157: The external Server sends a TCP packet for releasing a downlink TCP connection to the oRAN cache node that includes a TCP FIN flag.

Step 158: The oRAN cache node sends a TCP packet that includes a TCP ACK flag in response to the external Server.

It should be noted that, in step 155, if the oRAN cache node sends a TCP packet that includes a TCP RST flag to the external Server, step 157 will not be executed.

Step 159: After the resource reservation operation on the network side for the handover is successful, the oRAN cache node sends a TCP connection release command, for example, a TCP packet that includes a TCP FIN flag or a TCP RST flag, to the UE.

Step 160: When the UE receives the TCP packet for releasing the TCP connection that includes a TCP FIN flag and is sent by the oRAN cache node, the UE sends a TCP packet that includes a TCP ACK flag in response to the oRAN cache node.

Step 161: The UE sends a TCP packet for releasing an uplink TCP connection to the oRAN cache node, where the TCP packet includes a TCP FIN flag.

Step 162: The oRAN cache node sends a TCP packet that includes a TCP ACK flag in response to the UE.

It should be noted that, in step 159, if the oRAN cache node sends a TCP packet that includes a TCP RST flag to the UE, step 161 and step 162 will not be executed.

Step 163: The oRAN cache node sends a handover command (Handover Command) to the UE, commanding the UE to hand over to the target nRAN cache node.

Step 164: The UE is handed over to the target RAN cache node, which means that the UE accesses the target nRAN cache node.

Step 165: After the UE is handed over to the target nRAN cache node, if the UE finds that a TCP connection for video transmission is in a released state and finds that the video file is actually not completely transmitted, the UE initiates another TCP connection with the external Server through the target nRAN cache node.

After the UE detects that the TCP connection for downloading a data file or a part of content of a data file from the external server is released, preferably, the UE initiates establishment of another TCP connection with the external server after the UE is handed over to the target RAN cache; or the UE initiates establishment of another TCP connection with the external server after a short time (for example 50 ms) is delayed. The purpose of such processing is to prevent the UE from initiating establishment of another TCP connection with the external server through the source RAN cache, which causes that the TCP connection cannot be established or will be disconnected soon after establishment.

It should be noted that, when the UE downloads a video file by using an HTTP GET command, the external Server gives a total size of the video file in a response (refer to the program segment in the following table), and compares a size of the downloaded video content with the total size of the video file to determine whether the video content is completely downloaded, and therefore can determine whether the TCP connection is normally released or not normally released.

The process where the external Server gives the total size of the video file in its response is described as follows:
HTTP/1.1 200 OK
Date: Thu, 26 Apr. 2012 09:23:45 GMT
Server: IBM_HTTP_Server
Last-Modified: Sat, 31 Dec. 2011 13:39:39 GMT
ETag: "137c94-f94a90-4b5637b211cc0"
Accept-Ranges: bytes
Content-Length: 16337552
Keep-Alive: timeout=30, max=100
Connection: Keep-Alive
Content-Type: text/plain In the subsequent process of this embodiment, that is, after the UE is handed over to the target RAN cache, the target RAN cache may provide a video downloading service to the UE, with a difference from the first application example in that the HTTP message sent by the UE will include Range header information definitely because the UE has downloaded some content of the video file from the oRAN cache. The rest of the process is the same as that in the first application example. For details, refer to the previous description, which will not be described here again.

Afterwards, if the UE moves so that another handover is required, the handover process is the same as that in the application example and will not be described here again.

It should be noted that, all the foregoing embodiments of the present invention are applicable to 3GPP systems and networks including the GERAN, the UTRAN, and the EUTRAN, and that node devices corresponding to the RAN cache are respectively a BSC, an RNC, and an eNodeB.

Definitely, the embodiments of the present invention are also applicable to non-3GPP systems and networks, such as WiFi, 3GPP2 (such as CDMA-1×), and WiMax, and node devices corresponding to the RAN cache are respectively an AP, a BTS, and a BS.

In the foregoing embodiments, a video file is used as an example but is not limited thereto. The embodiments are also applicable to other types of content, such as MP3 and an installation package of the Linux operating system.

In the embodiments of the present invention, the UE may be any one of the following and may be static or moving. Static UEs may specifically include terminals, mobile stations, subscriber units, stations, or the like. Moving UEs may specifically include cellular phones, personal digital assistants (PDA), wireless modems, wireless communication devices, handheld devices, laptop computers, cordless phones, wireless local loop (WLL) stations, or the like. The UEs may be distributed in an entire wireless network.

It should be noted that, relational terms such as "first" and "second" are used to merely distinguish one entity or operation from another entity or operation and do not necessarily require or imply any such practical relations or sequences between or among the entities or operations. In addition, terms "include" and "comprise" or any variants thereof intend to express a non-exclusive inclusion and therefore a process, a method, an object, or a device that includes a series of elements includes not only these elements but also other elements that are not listed, or also includes inherent elements of the process, method, object, or device. Without more limitations, an element modified by "include one . . . " does not exclude that the process, method, object, or device that includes the element includes another identical element.

According to the description of the foregoing embodiments, a person skilled in the art may clearly understand that the present invention may be implemented by software plus a necessary general hardware platform or by hardware only. In most circumstances, the former is preferred. Based on such an understanding, the technical solutions of the present invention essentially, or the part contributing to the prior art may be implemented in a form of a software product. The computer software product is stored in a storage medium, such as a ROM/RAM, a magnetic disk, or an optical disc, and includes several instructions for instructing a computer device (which may be a personal computer, a server, a network device, or the like) to perform the methods described in the embodiments of the present invention or in some parts of the embodiments of the present invention.

Although the present invention have been described through some exemplary embodiments, it should be noted that a person of ordinary skill in the art may make various improvements or variations without departing from the principle of the present invention and all these improvements and variations shall fall within the protection scope of the present invention.

What is claimed is:

1. A data transmitting method, comprising:
   receiving, by a radio access (RAN) node, a request to apply for accessing content of a data file in an external server, the request received from a user equipment (UE), and the RAN node being configured to act as a proxy for establishing a Transmission Control Protocol (TCP) connection between the UE and the external server and for providing the data file to the UE;
   determining, by the RAN node, whether a first part of the content of the data file is stored in a memory RAN cache of the RAN node, determining whether the first part of the content of the data file is stored in the memory RAN cache of the RAN node comprising determining whether or not the request comprises range header information;
   transmitting, by a radio access (RAN) node the first part of the content to the UE in response to the RAN node determining that the first part of the content of the data file is stored in the memory RAN cache of the RAN node, wherein the RAN node determines that the first part of the content of the data file is stored in the memory RAN cache of the RAN node when the request does not comprise the range header information or according to start download position information in the range header information of the request;
   while the first part of the content is being transmitted to the UE by the RAN node, obtaining a second part of the content of the data file from the external server by the RAN node, wherein the first part of the content is different from the second part of the content and the first part of the content and the second part of the content form at least a portion of the content of the data file; and
   after all the first part of the content is transmitted to the UE, continuing to transmit the second part of the content to the UE.

2. The method according to claim 1, wherein, before receiving the request from the UE, the method further comprises:
   receiving a first Transmission Control Protocol (TCP) connection request sent by the UE to the external server; and
   activating a TCP proxy and acting as a proxy of the external server to send a first TCP connection response to the UE.

3. The method according to claim 2, wherein, after receiving the request from the UE or after receiving the first TCP connection request, the method further comprises:
   obtaining a URL corresponding to the data file according to the request to access the data file in the external server;
   respectively matching the obtained URL of the data file with stored URLs corresponding to multiple data files;
   if the matching is successful, determining whether the first part of the content of the data file requested and corresponding to the URL is stored in the RAN cache;
   if the first part of the content is stored in the RAN cache, sending the first part of the content of the data file to the UE; and if the matching is unsuccessful or if the first part of the content is not stored in the RAN cache, downloading the data file corresponding to the URL from the external server and transmitting the data file downloaded and corresponding to the URL to the UE.

4. The method according to claim 3, wherein, before downloading the data file corresponding to the URL from the external server, the method further comprises:
activating a Hypertext Transfer Protocol (HTTP) transparent proxy;
sending a second TCP connection request to the external server; and
receiving a second TCP connection response sent by the external server.

5. The method according to claim 1, wherein the method further comprises:
obtaining all content of the data file from the external server in response to determining that no content of the data file is stored in the memory RAN cache of the RAN node; and
transmitting all the obtained content of the data file to the UE.

6. A data transmitting method, comprising:
in a process of handing over a user equipment (UE) from a memory-equipped source radio access (RAN) cache node to a target RAN cache node, if the UE detects that a first Transmission Control Protocol (TCP) connection between the UE and the source RAN cache node for downloading a data file or a part of content of a data file from an external server is in a released state, establishing, by the UE using a message to the target RAN cache node including range header information, a second TCP connection with the external server through the target RAN cache node after a predetermined delay that prevents the second TCP connection from being made to the source RAN cache node, wherein the UE has received, from the source RAN cache node, a first part of the data file that is stored in a memory RAN cache of the source RAN cache node, and a second part of the data file that is obtained from the external server, the second part of the data file being sent by the source RAN cache node continuously after the first part of the data file has been sent, and wherein the first part of the data file is determined to be stored in the memory RAN cache of the source RAN cache node based on whether a request from the UE for accessing the external server comprises range header information; and
downloading, by the UE, a remaining portion of the data file or of the part of the content of the data file from the external server by using the second TCP connection.

7. The method according to claim 6, wherein, when the UE detects that the TCP connection for downloading a data file or a part of content of a data file from the external server is in a released state, the method further comprises:
determining whether the data file or the part of the content of the data file that is downloaded from the external server is completely downloaded;
if the data file or the part of the content of the data file that is downloaded from the external server is not completely downloaded, executing a step of reestablishing, by the UE, a TCP connection with the external server; and
if the data file or the part of the content of the data file that is downloaded from the external server is completely downloaded, determining that the TCP connection is in a normal released state.

8. The method according to claim 7, wherein determining whether the data file or the part of the content of the data file is completely downloaded comprises:
comparing to determine whether a size of downloaded content of the data file is greater than a size of the data file;
if the size of the downloaded content is greater than or equal to the size of the data file, determining that the content of the data file is completely downloaded; and
if the size of the downloaded content is less than the size of the data file, determining that the content of the data file is not completely downloaded.

9. The method according to claim 7, wherein determining whether the data file or the part of the content of the data file is completely downloaded comprises:
comparing to determine whether a size of downloaded part of the content of the data file is greater than a size of the data file;
if the size of the downloaded part of the content is greater than or equal to the size of the data file, determining that the content of the data file is completely downloaded; and
if the size of the downloaded part of the content is less than the size of the data file, determining that the content of the data file is not completely downloaded.

10. The method according to claim 6, wherein, after the UE detects that the TCP connection for downloading a data file or a part of content of a data file from the external server is released, the method further comprises initiating, by the UE and after the UE is handed over to the target RAN cache node, establishment of the second TCP connection with the external server through the target RAN cache node.

11. A handover method, comprising:
transmitting a first part of content of a data file by a memory-equipped source radio access (RAN) cache node to a user equipment (UE) in response to a request from the UE for accessing the content of the data file in an external server, the source RAN cache node determining whether the first part of the content of the data file is stored in a memory RAN cache of the source RAN cache node based on whether the request comprises range header information;
after all the first part of the content is transmitted to the UE, continuing to transmit a second part of the content to the UE, the second part of the content being obtained from the external server;
selecting a memory-equipped target radio access RAN cache node, the selecting being performed by the memory-equipped source radio access RAN cache node for the a user equipment (UE that requires handover;
if a Transmission Control Protocol (TCP) connection exists between the source RAN cache node and the external server, sending, by the source RAN cache node, a TCP connection release command to the external server in response to the UE requiring the handover;
receiving, by the source RAN cache node, a TCP reply packet for releasing the TCP connection sent by the external server;
sending, by the source RAN cache node after the source RAN cache node receives the TCP reply packet for releasing the TCP connection sent by the external server, a TCP connection release command to the UE;
receiving, by the source RAN cache node, a TCP reply packet for releasing the TCP connection sent by the UE; and sending, by the source RAN cache node after the source RAN cache node receives the TCP reply packet for releasing the TCP connection sent by the UE, a handover command to the UE, so that the UE is handed over to the target RAN cache.

12. A handover apparatus, comprising a computer device including a non-transitory computer-readable medium storing program modules executable by the computer device, the modules including:
 a third sending module, configured to, send a first part of content of a data file to a user equipment (UE) in response to a request of the UE for accessing the content of the data file in an external server, the first part of content of a data file being stored in a memory RAN cache of the handover apparatus, and the handover apparatus determining whether the first part of the content of the data file is stored in the memory RAN cache based on whether the request comprises range header information, and after all the first part of the content is transmitted to the UE, continue to send a second part of the content to the UE, the second part of the content being obtained from the external server;
 a selecting module, configured to select a memory-equipped target radio access RAN cache node for a user equipment (UE) the UE that requires handover and request the target RAN cache node to reserve a radio resource for the UE;
 a first sending module, configured to, when a Transmission Control Protocol (TCP) connection exists between the handover apparatus and the external server, send a TCP connection release command to the external server in response to the UE requiring the handover;
 a first receiving module, configured to receive a TCP reply packet for releasing the TCP connection sent by the external server;
 a second sending module, configured to, when the first receiving module receives from the external server, the TCP reply packet for releasing the TCP connection, send a TCP connection release command to the UE;
 a second receiving module, configured to receive a TCP reply packet for releasing the TCP connection sent by the UE; and
 a handover module, configured to send a handover command to the UE after the second receiving module receives the TCP reply packet for releasing the TCP connection sent by the UE, the handover command instructing the UE to hand over to the target RAN cache node.

13. A radio access node, comprising:
 a radio transceiver, configured to receive from a user equipment (UE) a request to access a data file in an external server, the radio access (RAN) node being configured to act as a proxy for establishing a Transmission Control Protocol (TCP) connection between the UE and the external server and for providing the data file to the UE; and
 a processor, configured to, when the radio transceiver receives the request, determine whether a first part of content of the data file is stored in a memory of a radio access node (RAN) cache of the RAN node by determining whether or not the request comprises range header information, wherein the processor determines that the first part of the content of the data file is stored in the memory of the RAN cache in response to the request not having the range header information or according to start download position information in the range header information of the request, the processor further configured to transmit the first part of the content to the radio transceiver when the first part of the content is stored in the memory of the RAN cache, the processor further configured to obtain a second part of the content of the data file from the external server while the first part of the content is being transmitted to the radio transceiver, and to transmit the second part of the content to the radio transceiver, wherein the first part of the content is different from the second part of the content and the first part of the content and the second part of the content form at least a portion of the content of the data file; and
 wherein the radio transceiver is further configured to, after the first part of the content sent by the processor is received, transmit the first part of the content to the UE and, after all the first part of the content is transmitted, continue to transmit the second part of the content to the UE.

14. The radio access node according to claim 13, wherein the processor is further configured to, before the request to access the data file in the external server is received from the user equipment (UE), receive a first TCP connection request sent by the UE to the external server, and to activate a TCP proxy and act as a proxy of the external server to send a first TCP connection response to the radio transceiver; and
 wherein the radio transceiver is further configured to send the received first TCP connection response to the UE.

15. The radio access node according to claim 13, wherein the processor is further configured to, after the request to access the data file in the external server is received from the user equipment UE or after a first TCP connection request sent by the UE to the external server is received, obtain a URL corresponding to the data file according to the request to access data file in the external server, to respectively match the obtained URL of the data file with stored URLs corresponding to multiple data files, determine whether content of the data file requested and corresponding to the URL is stored in the RAN cache if the matching is successful, to send the content of the data file stored in the RAN cache and corresponding to the URL to the UE if the content is stored in the RAN cache, and to download the data file corresponding to the URL from the external server and send the data file corresponding to the URL to the radio transceiver if the matching is unsuccessful or the content is not stored in the RAN cache; and
 wherein the radio transceiver is further configured to transmit the data file received and corresponding to the URL to the UE.

16. A user equipment, comprising:
 a detector, configured to, when the user equipment (UE) is handed over from a memory-equipped source radio access (RAN) cache node to a target RAN cache node, detect whether a first Transmission Control Protocol (TCP) connection between the UE and the source RAN cache node for downloading a data file from an external server is in a released state, wherein the UE is configured to receive, from the source RAN cache node, a first part of the data file that is stored in a memory RAN cache of the source RAN cache node, and a second part of the data file that is obtained from the external server, the second part of the data file being sent by the source RAN cache node continuously after the first part of the data file has been sent, and wherein the first part of the data file is determined to be stored in the memory RAN cache of the source RAN cache node based on whether a request from the UE for accessing the external server comprises range header information; and a processor, configured to, when the detector detects that the first TCP connection is in a released state, establish a second TCP connection with the external server after a predetermined delay prevents the second TCP connection from being made to the source RAN cache node and using a message sent through the target RAN cache node including range header information, and continue to download the data file from the external server by using the second TCP connection.

17. The user equipment according to claim 16, wherein the processor is further configured to:
   when the detector detects that the first TCP connection for downloading a data file is in a released state, determine whether the data file is completely downloaded;
   if the data file is not completely downloaded, establish the second TCP connection with the external server connected to the RAN cache node; and
   if the data file is completely downloaded, determine that the first TCP connection for downloading a data file is in a normal released state.

18. A data transmitting system, comprising:
   a user equipment (UE);
   a memory-equipped radio access (RAN) cache node; and
   an external server;
   wherein the UE is configured to request to apply for accessing a data file in the external server, and receive the data file sent by the RAN cache node;
   wherein the RAN cache node is configured to:
      after receiving a request to apply for accessing the data file in the external server from the UE and if it is determined that a first part of content of the data file is stored in a memory of the RAN cache node, transmit the first part of the content to the UE, wherein the RAN cache node determines whether the first part of the content of the data file is stored in the memory of the RAN cache node by determining whether or not the request comprises range header information, and wherein the first part of the content of the data file is determined to be stored in the memory in response to determining that the request does not have the range header information or according to start download position information in a range header of the request, wherein the RAN cache node is configured to act as a proxy for establishing a Transmission Control Protocol (TCP) connection between the UE and the external server and for providing the data file to the UE;
      when transmitting the first part of the content to the UE, request with the external server to obtain a second part of the content of the data file;
      receive a second part of the content of the data file that is sent by the external server while the first part of the content is being transmitted to the UE, wherein the first part of the content is different from the second part of the content and the first part of the content and the second part of the content form at least a portion of the content of the data file; and
      after all the first part of the content is transmitted to the UE, continue to transmit the second part of the content to the UE; and
   wherein the external server is configured to, when receiving from the RAN cache node the request to obtain the second part of the content of the data file, send the second part of the content of the data file to the RAN cache node.

19. A data transmitting system, comprising:
   a user equipment (UE); and
   an external server;
   wherein the user equipment is configured to:
      in a process of handover from a memory-equipped source radio access (RAN) cache node to a target RAN cache node, if it is detected that a first Transmission Control Protocol (TCP) connection between the UE and the source RAN cache node for downloading a data file or a part of content of a data file from the external server is in a released state, establish a second TCP connection through the target RAN cache node after a predetermined delay that prevents the second TCP connection from being made to the source RAN cache node by sending a TCP connection request using a message including range header information to the external server and receiving a TCP connection response sent by the external server, wherein the UE is configured to receive, from the source RAN cache node, a first part of the data file that is stored in a memory RAN cache of the source RAN cache node, and a second part of the data file that is obtained from the external server, the second part of the data file being sent by the source RAN cache node continuously after the first part of the data file has been sent, and wherein the first part of the data file is determined to be stored in the memory RAN cache of the source RAN cache node based on whether a request from the UE for accessing the external server comprises range header information;
      request from the external server to download the data file or download remaining content of the part of the content of the data file by using the second TCP connection; and
      receive the data file that are sent by the external server or download the remaining content of the part of the content of the data file; and
   wherein the external server is configured to:
      receive the TCP connection request sent by the user equipment and send the TCP connection response to the UE; and
      when receiving from the UE the request to download the data file or downloading the remaining content of the part of the content of the data file, send the data file or the rest content of the part of the content of the data file to the UE.

20. A handover system, comprising:
   a user equipment (UE);
   a memory-equipped source radio access (RAN) cache node; and
   an external server;
   wherein the source RAN cache node is configured to:
      transmit a first part of content of a data file to the UE in response to a request from the UE for accessing the content of the data file in an external server, the source RAN cache node determining whether the first part of the content of the data file is stored in a memory RAN cache of the source RAN cache node based on whether the request comprises range header information;
      after all the first part of the content is transmitted to the UE, continue to transmit a second part of the content to the UE, the second part of the content being obtained from the external server;
      select a memory-equipped target radio access RAN cache node for the user equipment UE that requires handover;

when it is determined that a Transmission Control Protocol (TCP) connection exists between the source RAN cache node and the external server, send a TCP connection release command to the external server by using the TCP connection in response to the UE requiring the handover;

send a TCP connection release command to the UE after receiving a TCP reply packet for releasing the TCP connection sent by the external server; and send a handover command to the UE after receiving a TCP reply packet for releasing the TCP connection sent by the UE;

wherein the external server is configured to receive the TCP connection release command sent by the source RAN cache node and to send the TCP reply packet for releasing the TCP connection to the source RAN cache node; and wherein the UE is configured to receive the TCP connection release command sent by the source RAN cache node, to send the TCP reply packet for releasing the TCP connection to the source RAN cache node, and, when receiving the handover command sent by the source RAN cache node, to hand over to the target RAN cache according to the handover command.

* * * * *